United States Patent
Damnjanovic et al.

(10) Patent No.: US 10,581,569 B2
(45) Date of Patent: *Mar. 3, 2020

(54) TECHNIQUES FOR TRANSMITTING AND RECEIVING SYNCHRONIZATION SIGNALS OVER AN UNLICENSED RADIO FREQUENCY SPECTRUM BAND

(71) Applicant: QUALCOMM Incorporated, San Diego, CA (US)

(72) Inventors: Aleksandar Damnjanovic, Del Mar, CA (US); Madhavan Srinivasan Vajapeyam, San Diego, CA (US); Wanshi Chen, San Diego, CA (US); Peter Gaal, San Diego, CA (US); Tao Luo, San Diego, CA (US); Durga Prasad Malladi, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 14/819,620

(22) Filed: Aug. 6, 2015

(65) Prior Publication Data
US 2016/0056935 A1 Feb. 25, 2016

Related U.S. Application Data

(60) Provisional application No. 62/040,787, filed on Aug. 22, 2014.

(51) Int. Cl.
*H04L 5/00* (2006.01)
*H04W 24/08* (2009.01)
(Continued)

(52) U.S. Cl.
CPC .......... *H04L 5/0048* (2013.01); *H04W 24/08* (2013.01); *H04W 56/00* (2013.01);
(Continued)

(58) Field of Classification Search
CPC ... H04W 16/14; H04W 24/10; H04W 72/042; H04W 72/0453; H04W 74/02; H04W 74/0808; H04W 76/023
See application file for complete search history.

(56) References Cited

U.S. PATENT DOCUMENTS 6,014,376 A * 1/2000 Abreu ................. H04B 7/2696
370/324
8,989,762 B1 * 3/2015 Negus .................. H04W 24/02
455/454

(Continued)

FOREIGN PATENT DOCUMENTS

CN 103155638 A 6/2013
CN 103765824 A 4/2014
(Continued)

OTHER PUBLICATIONS

Holma et al., LTE for UMTS: Evolution to LTE-Advanced, Second Edition, Apr. 2011, 14 pgs., XP_55235498A, ISBN: 978-0-470-66000-3, A John Wiley and Sons, Ltd., UK.
(Continued)

*Primary Examiner* — Ayaz R Sheikh
*Assistant Examiner* — Debebe A Asefa
(74) *Attorney, Agent, or Firm* — Holland & Hart LLP

(57) ABSTRACT

Techniques are described for wireless communication. A first method may include receiving at a user equipment (UE) over an unlicensed radio frequency spectrum band an indication of a time window associated with a transmission of a synchronization signal, and monitoring the unlicensed radio frequency spectrum band during the time window to receive
(Continued)

a synchronization signal from a base station. A second method may include transmitting an indication of a time window associated with a transmission of a synchronization signal; performing a plurality of clear channel assessments (CCAs) on an unlicensed radio frequency spectrum band during the time window; and transmitting the synchronization signal over the unlicensed radio frequency spectrum band at a transmission time during the time window. The transmission time may be based at least in part on a result of at least one of the CCAs.

118 Claims, 22 Drawing Sheets

(51) Int. Cl.
| | | |
|---|---|---|
| *H04W 56/00* | (2009.01) | |
| *H04W 72/04* | (2009.01) | |
| *H04W 72/08* | (2009.01) | |
| *H04W 74/00* | (2009.01) | |
| *H04W 76/27* | (2018.01) | |
| *H04W 76/12* | (2018.01) | |
| *H04W 88/08* | (2009.01) | |

(52) U.S. Cl.
CPC ... *H04W 56/0015* (2013.01); *H04W 72/0446* (2013.01); *H04W 72/082* (2013.01); *H04W 74/006* (2013.01); *H04W 76/12* (2018.02); *H04W 76/27* (2018.02); *H04W 88/08* (2013.01)

(56) References Cited

U.S. PATENT DOCUMENTS

| | | | |
|---|---|---|---|
| 9,264,997 B2 | 2/2016 | Gaal et al. | |
| 9,769,789 B2 | 9/2017 | Damnjanovic et al. | |
| 2009/0067373 A1* | 3/2009 | Kneckt | H04W 52/0216 370/328 |
| 2010/0113082 A1 | 5/2010 | Ishii et al. | |
| 2013/0107116 A1 | 5/2013 | Charbit et al. | |
| 2013/0203429 A1* | 8/2013 | Kneckt | H04W 72/1263 455/450 |
| 2013/0203458 A1 | 8/2013 | Charbit et al. | |
| 2013/0258936 A1* | 10/2013 | Choi | H04W 72/0453 370/312 |
| 2014/0044105 A1 | 2/2014 | Bontu et al. | |
| 2014/0050206 A1 | 2/2014 | Seo et al. | |
| 2014/0112289 A1 | 4/2014 | Kim et al. | |
| 2014/0140314 A1 | 5/2014 | Wei et al. | |
| 2014/0378157 A1 | 12/2014 | Wei et al. | |
| 2017/0208588 A1 | 7/2017 | Park et al. | |
| 2018/0145810 A1 | 5/2018 | Damnjanovic et al. | |

FOREIGN PATENT DOCUMENTS

| | | |
|---|---|---|
| JP | 2014500685 A | 1/2014 |
| WO | WO-2012049533 A1 | 4/2012 |
| WO | WO-2012137295 A1 | 10/2012 |
| WO | WO-2013006988 A1 | 1/2013 |
| WO | WO-2013126858 A1 | 8/2013 |
| WO | WO-2014008032 A2 | 1/2014 |

OTHER PUBLICATIONS

ISA/EPO, International Search Report and Written Opinion of the International Searching Authority, Int'l App. No. PCT/US2015/044250, dated Mar. 17, 2016, European Patent Office, Rijswijk, NL, 18 pgs.

Schuh, "LTE: Der Mobilfunk der Zukunft Synchronization and Cell Search," Seminar Ausgewählte Kapitel der Nachrichtentechnik, WS 2009/2010, Feb. 4, 2010, pp. 1-11, XP_55085456A, URL: http://www.Imk.Int.de/fileadmin/Lehre/Seminar09/ausarbeitungen/Ausarbeitung_Schuh.pdf, Lehrstuhl für Digitale Übertragung, DE.

Fu et al., "Multicarrier Technology for 4G WiMAX System," WiMAX/LTE Update, IEEE Communications Magazine, Aug. 2010, pp. 50-58, XP_11315995A, Institute of Electrical and Electronics Engineers.

IPEA/EPO, Partial International Search Report of the International Preliminary Examining Authority, Int'l. App. No. PCT/US2015/044250, dated Oct. 28, 2015, European Patent Office, Rijswijk, NL, 4 pgs.

Shen et al., "Overview of 3GPP LTE-Advanced Carrier Aggregation for 4G Wireless Communications," LTE-Advanced and 4G Wireless Communications, IEEE Communications Magazine, Feb. 2012, pp. 122-130, XP_11417048A, Institute of Electrical and Electronics Engineers.

Taiwan Search Report—TW104126854—TIPO—dated Mar. 21, 2019.

European Search Report—EP19195380—Search Authority—Munich—Jan. 9, 2020.

* cited by examiner

TECHNIQUES FOR TRANSMITTING AND RECEIVING SYNCHRONIZATION SIGNALS OVER AN UNLICENSED RADIO FREQUENCY SPECTRUM BAND

CROSS REFERENCES

The present Application for Patent claims priority to U.S. Provisional Patent Application No. 62/040,787 by Damnjanovic et al., entitled "Techniques for Transmitting and Receiving Synchronization Signals Over an Unlicensed Radio Frequency Spectrum Band," filed Aug. 22, 2014, assigned to the assignee hereof, and expressly incorporated by reference herein.

FIELD OF THE DISCLOSURE

The present disclosure, for example, relates to wireless communication systems, and more particularly to techniques for transmitting and receiving synchronization signals over an unlicensed radio frequency spectrum band.

BACKGROUND

Wireless communication systems are widely deployed to provide various types of communication content such as voice, video, packet data, messaging, broadcast, and so on. These wireless communication systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication apparatuses, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications between a base station and a UE over an unlicensed radio frequency spectrum band, or over different radio frequency spectrum bands (e.g., a licensed radio frequency spectrum band and/or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, an unlicensed radio frequency spectrum band, a base station or UE may perform a listen before talk (LBT) procedure to contend for access to the unlicensed radio frequency spectrum band. An LBT procedure may include performing a clear channel assessment (CCA) procedure to determine whether a channel of the unlicensed radio frequency spectrum band is available. When it is determined that the channel of the unlicensed radio frequency spectrum band is not available (e.g., because another apparatus is already using the channel of the unlicensed radio frequency spectrum band), a CCA procedure may be performed for the channel again at a later time.

Before a UE may communicate with a base station, the UE may need to discover or acquire the base station (or a cell). After a UE discovers the base station or cell, the UE may need to periodically synchronize with the base station or cell in order to properly communicate with, and decode communications from, the base station. In some examples, a base station may transmit a synchronization signal, and a UE may receive and decode the synchronization signal to discover and/or synchronize with the base station (or with a cell).

SUMMARY

The present disclosure, for example, relates to one or more techniques for transmitting and receiving synchronization signals over an unlicensed radio frequency spectrum band. In some environments, a base station may transmit synchronization signals over an unlicensed radio frequency spectrum band. However, when, for example, the signal-to-noise plus interference ratio (SNIR) on the unlicensed radio frequency spectrum band is low, or when other transmitting apparatuses prevent the base station from successfully contending for access to the unlicensed radio frequency spectrum band, the base station may be unable to transmit one or more synchronization signals. When the base station is unable to transmit one or more synchronization signals, user equipments (UEs) may be unable to discover or acquire the base station, and/or the base station's connected UEs may fall out of sync with the base station and be unable to communicate with the base station.

The described techniques enable a base station to transmit synchronization signals over an unlicensed radio frequency spectrum band in a synchronous, asynchronous, and/or opportunistic manner, which may improve the base station's ability to transmit synchronization signals in a reliable manner.

In a first set of illustrative examples, a method for wireless communication is described. In one example, the method may include receiving at a UE over an unlicensed radio frequency spectrum band an indication of a time window associated with a transmission of a synchronization signal, and monitoring the unlicensed radio frequency spectrum band during the time window to receive a synchronization signal from a base station.

In some examples of the method, monitoring the unlicensed radio frequency spectrum band during the time window may include waking up a receiver of the UE from a sleep state prior to the time window.

In some examples, the method may include receiving, during the time window, timing information from the base station, the timing information including an indication of one of a group consisting of: a current frame of the base station, a current subframe of the base station, or a current symbol. In some examples, the method may include synchronizing the UE with the base station based at least in part on the timing information.

In some examples, the method may include monitoring the unlicensed radio frequency spectrum band during a CCA-exempt transmission (CET) of the base station to receive the synchronization signal from the base station. In some examples, the method may include monitoring the unlicensed radio frequency spectrum band during a periodic fixed subframe location to receive a transmission of the synchronization signal subject to CCA from the base station.

In some examples, the time window may be associated with a different set of subcarrier frequencies of the unlicensed radio frequency spectrum band than the transmission subject to CCA. In some examples, the time window may overlap in time with the periodic fixed subframe location of the base station.

In some examples of the method, the time window may replace at least one CET of the base station. In some examples of the method, the indication of the time window may be received in a system information block or a master information block. In some examples of the method, the indication of the time window may be received in a radio resource control (RRC) message.

In some examples, the method may include receiving system information for the base station during the time window. The system information may be received in a system information block or a master information block.

In some examples, the method may include performing radio resource management measurements on the synchronization signal. In some examples of the method, the synchronization signal may include one of a group consisting of: a primary synchronization signal (PSS), a secondary synchronization signal (SSS), a cell-specific reference signal (CRS), and a channel state information reference signal (CSI-RS).

In a second set of illustrative examples, an apparatus for wireless communication is described. In one example, the apparatus may include means for receiving at a UE over an unlicensed radio frequency spectrum band an indication of a time window associated with a transmission of a synchronization signal, and means for monitoring the unlicensed radio frequency spectrum band during the time window to receive a synchronization signal from a base station. In some examples, the apparatus may further include means for implementing one or more aspects of the method for wireless communication described above with respect to the first set of illustrative examples.

In a third set of illustrative examples, another apparatus for wireless communication is described. In one example, the apparatus may include a processor and memory coupled to the processor. The processor may be configured to receive at a UE over an unlicensed radio frequency spectrum band an indication of a time window associated with a transmission of a synchronization signal, and monitor the unlicensed radio frequency spectrum band during the time window to receive a synchronization signal from a base station. In some examples, the processor may also be configured to implement one or more aspects of the method for wireless communication described above with respect to the first set of illustrative examples.

In a fourth set of illustrative examples, a non-transitory computer-readable medium for storing instructions executable by a processor for wireless communication is described. The non-transitory computer-readable medium may include instructions to receive at a UE over an unlicensed radio frequency spectrum band an indication of a time window associated with a transmission of a synchronization signal, and instructions to monitor the unlicensed radio frequency spectrum band during the time window to receive a synchronization signal from a base station. In some examples, the computer-readable medium may also include instructions to implement one or more aspects of the method for wireless communication described above with respect to the first set of illustrative examples.

In a fifth set of illustrative examples, another method for wireless communication may include transmitting an indication of a time window associated with a transmission of a synchronization signal; performing a number of CCAs on an unlicensed radio frequency spectrum band during the time window; and transmitting the synchronization signal over the unlicensed radio frequency spectrum band at a transmission time during the time window, where the transmission time is based at least in part on a result of at least one of the CCAs.

In some examples of the method, performing the number of CCAs on the unlicensed radio frequency spectrum band during the time window may include identifying a first successful one of the CCAs during the time window. In these examples, the transmission time may follow the first successful one of the CCAs during the time window.

In some examples of the method, performing the number of CCAs on the unlicensed radio frequency spectrum band during the time window may include determining that none of the CCAs performed during the time window were successful. In these examples, the transmission time may occur at an end of the time window.

In some examples, the method may include transmitting timing information during the time window. The timing information may include an indication of one of a group consisting of: a current frame of the base station, a current subframe of the base station, or a current symbol.

In some examples, the method may include transmitting the synchronization signal over the unlicensed radio frequency spectrum band during a CET. In some examples, the method may include transmitting downlink control information (DCI) for a subframe in which the synchronization signal is transmitted. The DCI may signal at least one resource used to transmit the synchronization signal in the subframe.

In some examples, the method may include transmitting the synchronization signal over the unlicensed radio frequency spectrum band opportunistically, during a periodic fixed subframe location. In some examples, the time window may be associated with a different set of subcarrier frequencies of the unlicensed radio frequency spectrum band than the transmission subject to CCA. In some examples, the time window may overlap in time with the periodic fixed subframe location of the base station.

In some examples of the method, the time window may replace at least one CET of a base station. In some examples, the number of CCAs may include a plurality of CCAs. In some examples of the method, the indication of the time window may be transmitted in a system information block or a master information block. In some examples of the method, the indication of the time window may be transmitted in an RRC message. In some examples, the method may include transmitting system information for the base station during the time window. The system information may be transmitted in a system information block or a master information block.

In some examples of the method, the synchronization signal may include one of a group consisting of: a PSS, an SSS, a CRS, and a CSI-RS.

In a sixth set of illustrative examples, another apparatus for wireless communication is described. In one example, the apparatus may include means for transmitting an indication of a time window associated with a transmission of a synchronization signal; means for performing a number of CCAs on an unlicensed radio frequency spectrum band during the time window; and means for transmitting the synchronization signal over the unlicensed radio frequency spectrum band at a transmission time during the time window, where the transmission time is based at least in part on a result of at least one of the CCAs. In some examples, the apparatus may further include means for implementing one or more aspects of the method for wireless communication described above with respect to the fifth set of illustrative examples.

In a seventh set of illustrative examples, another apparatus for wireless communication is described. In one example, the apparatus may include a processor and memory coupled to the processor. The processor may be configured to transmit an indication of a time window associated with a transmission of a synchronization signal; perform a number of CCAs on an unlicensed radio frequency spectrum band during the time window; and transmit the synchronization signal over the unlicensed radio frequency spectrum band at a transmission time during the time window, where the transmission time is based at least in part on a result of at least one of the CCAs. In some examples, the processor may also be configured to implement one or more aspects of the method for wireless communication described above with respect to the fifth set of illustrative examples.

In an eighth set of illustrative examples, another non-transitory computer-readable medium for storing instructions executable by a processor for wireless communication is described. In one example, the computer-readable medium may include instructions to transmit an indication of a time window associated with a transmission of a synchronization signal; instructions to perform a number of CCAs on an unlicensed radio frequency spectrum band during the time window; and instructions to transmit the synchronization signal over the unlicensed radio frequency spectrum band at a transmission time during the time window, wherein the transmission time is based at least in part on a result of at least one of the CCAs. In some examples, the computer-readable medium may also include instructions to implement one or more aspects of the method for wireless communication described above with respect to the fifth set of illustrative examples.

In a ninth set of illustrative examples, another method for wireless communication is described. In one example, the method may include monitoring an unlicensed radio frequency spectrum band, at a UE, to receive a transmission of a synchronization signal from a base station, and receiving the synchronization signal from the base station.

In some examples of the method, receiving the synchronization signal may include receiving the synchronization signal with timing information. The timing information may include an indication of a current frame of the base station and a current subframe of the base station. In some examples of the method, the timing information may include an indication of a current frame of the base station, a current subframe of the base station, and a current symbol.

In some examples, the method may include synchronizing the UE with the base station based at least in part on the timing information. In some examples, the method may include receiving system information for the base station with the synchronization signal. The system information may be received in a system information block or a master information block.

In some examples, the method may include performing radio resource management measurements on the synchronization signal. In some examples of the method, the synchronization signal may include one of a group consisting of: a PSS, an SSS, a CRS, and a CSI-RS.

In a tenth set of illustrative examples, an apparatus for wireless communication is described. In one example, the apparatus may include means for monitoring an unlicensed radio frequency spectrum band, at a UE, to receive a transmission of a synchronization signal from a base station, and means for receiving the synchronization signal from the base station. In some examples, the apparatus may further include means for implementing one or more aspects of the method for wireless communication described above with respect to the ninth set of illustrative examples.

In an eleventh set of illustrative examples, an apparatus for wireless communication is described. In one example, the apparatus may include a processor and memory coupled to the processor. The processor may be configured to monitor an unlicensed radio frequency spectrum band, at a UE, to receive a transmission of a synchronization signal from a base station, and receive the synchronization signal from the base station. In some examples, the processor may also be configured to implement one or more aspects of the method for wireless communication described above with respect to the ninth set of illustrative examples.

In a twelfth set of illustrative examples, a non-transitory computer-readable medium for storing instructions executable by a processor for wireless communication is described. The computer-readable medium may include instructions to monitor an unlicensed radio frequency spectrum band, at a UE, instructions to receive a transmission of a synchronization signal from a base station; and instructions to receive the synchronization signal with timing information from the base station. In some examples, the computer-readable medium may also include instructions to implement one or more aspects of the method for wireless communication described above with respect to the ninth set of illustrative examples.

In a thirteenth set of illustrative examples, another method for wireless communication is described. In one example, the method may include performing, at a base station, a number of CCAs on an unlicensed radio frequency spectrum band, and transmitting a synchronization signal over the unlicensed radio frequency spectrum band, at a transmission time based at least in part on a result of at least one of the CCAs.

In some examples of the method, transmitting the synchronization signal may include transmitting the synchronization signal with timing information. The timing information may include an indication of a current frame of the base station and a current subframe of the base station. In some examples of the method, the timing information may include an indication of a current frame of the base station, a current subframe of the base station, and a current symbol.

In some examples of the method, performing the number of CCAs on the unlicensed radio frequency spectrum band may include identifying a first successful one of the CCAs. In these examples, the transmission time may follow the first successful one of the CCAs.

In some examples of the method, performing the number of CCAs on the unlicensed radio frequency spectrum band may include determining that none of the CCAs were successful. In these examples, the transmission time may follow a performance of a last unsuccessful one of the number of CCAs.

In some examples of the method, the number of CCAs may include a plurality of CCAs. In some examples, the method may include transmitting system information for the base station with the synchronization signal. The system information may be transmitted in a system information block or a master information block. In some examples of the method, the synchronization signal comprises one of a group consisting of: a PSS, an SSS, a CRS, and a CSI-RS.

In a fourteenth set of illustrative examples, an apparatus for wireless communication is described. In one example, the apparatus may include means for performing, at a base station, a number of CCAs on an unlicensed radio frequency spectrum band, and means for transmitting a synchronization signal over the unlicensed radio frequency spectrum band, at a transmission time based at least in part on a result of at least one of the CCAs. In some examples, the apparatus may further include means for implementing one or more aspects of the method for wireless communication described above with respect to the thirteenth set of illustrative examples.

In a fifteenth set of illustrative examples, an apparatus for wireless communication is described. In one example, the apparatus may include a processor and memory coupled to the processor. The processor may be configured to perform, at a base station, a number of CCAs on an unlicensed radio frequency spectrum band, and transmit a synchronization signal over the unlicensed radio frequency spectrum band, at a transmission time based at least in part on a result of at least one of the CCAs. In some examples, the processor may also be configured to implement one or more aspects of the method for wireless communication described above with respect to the thirteenth set of illustrative examples.

In a sixteenth set of illustrative examples, a non-transitory computer-readable medium for storing instructions executable by a processor for wireless communication is described. The computer-readable medium may include instructions to perform, at a base station, a number of CCAs on an unlicensed radio frequency spectrum band, and instructions to transmit a synchronization signal over the unlicensed radio frequency spectrum band, at a transmission time based at least in part on a result of at least one of the CCAs. In some examples, the computer-readable medium may also include instructions to implement one or more aspects of the method for wireless communication described above with respect to the thirteenth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If the first reference label is used in the specification, the description is applicable to any one of the similar components having the same first reference label irrespective of the second reference label.

DETAILED DESCRIPTION

Figure 1:
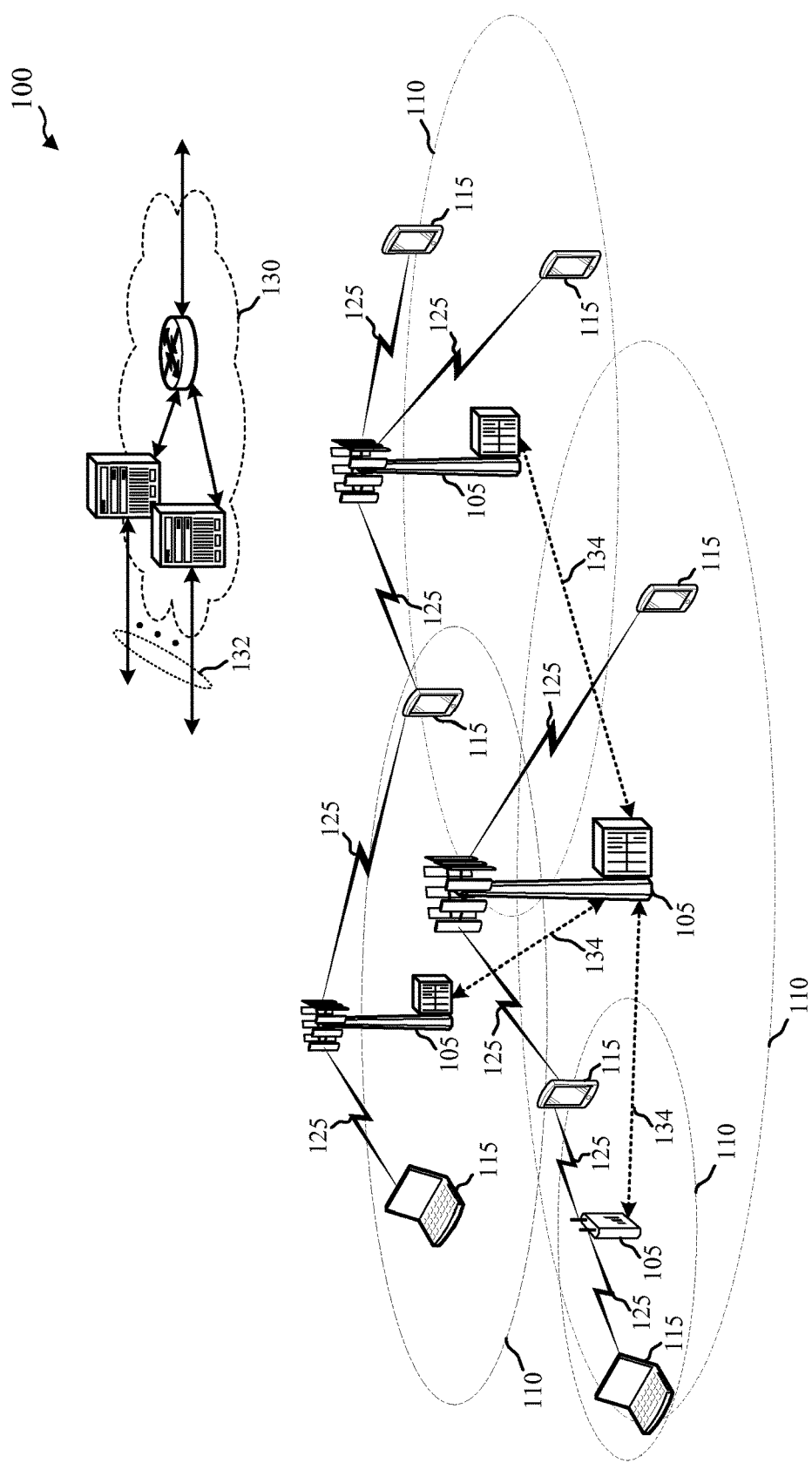
FIG. 1 illustrates an example of a wireless communication system, in accordance with various aspects of the disclosure.

Techniques are described in which an unlicensed radio frequency spectrum band is used for at least a portion of communications over a wireless communication system. In some examples, the unlicensed radio frequency spectrum band may be used by the base stations and user equipments (UEs) of a cellular network for Long Term Evolution (LTE) communications and/or LTE-Advanced (LTE-A) communications, and by Wi-Fi access points and Wi-Fi stations of a Wi-Fi network for Wi-Fi communications. The unlicensed radio frequency spectrum band may be used by the cellular network in combination with, or independent from, a licensed radio frequency spectrum band. In some examples, the unlicensed radio frequency spectrum band may be a radio frequency spectrum band for which an apparatus may need to contend for access because the radio frequency spectrum band is available, at least in part, for unlicensed use, such as Wi-Fi use.

Prior to gaining access to, and communicating over, an unlicensed radio frequency spectrum band, a base station or UE may perform a listen before talk (LBT) procedure to contend for access to the unlicensed radio frequency spectrum band. An LBT procedure may include performing a clear channel assessment (CCA) procedure to determine whether a channel of the unlicensed radio frequency spectrum band is available. When it is determined that the channel of the unlicensed radio frequency spectrum band is not available (e.g., because another apparatus is already using the channel of the unlicensed radio frequency spectrum band), a CCA procedure may be performed for the channel again at a later time.

In some environments, the SNIR of the unlicensed radio frequency spectrum band may be low, or other transmitting apparatuses may prevent a base station from successfully contending for access to the unlicensed radio frequency spectrum band. In these environments, the base station may be unable to transmit one or more synchronization signals. When the base station is unable to transmit one or more synchronization signals, UEs may be unable to discover or acquire the base station, and/or the base station's connected UEs may fall out of sync with the base station and be unable to communicate with the base station.

The described techniques enable a base station to transmit synchronization signals over an unlicensed radio frequency spectrum band in a synchronous, asynchronous, and/or opportunistic manner, which may improve the base station's ability to transmit synchronization signals in a reliable manner. In some examples, a base station may transmit an indication of a time window, and may asynchronously transmit synchronization signals during the time window.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro and/or small cell base stations). There may be overlapping geographic coverage areas 110 for different technologies.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

The wireless communication system 100 may be or include a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, and/or uplink (UL) transmissions from a UE 115 to a base station 105. The downlink transmissions may also be called forward link transmissions, while the uplink transmissions may also be called reverse link transmissions. In some examples, DL transmissions may include transmissions of discovery signals, including, for example, reference signals and/or synchronization signals.

In some examples, each of the communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency division duplex (FDD) operation (e.g., using paired spectrum resources) or a time division duplex (TDD) operation (e.g., using unpaired spectrum resources). Frame structures for FDD operation (e.g., frame structure type 1) and TDD operation (e.g., frame structure type 2) may be defined.

Each carrier may be provided over a licensed radio frequency spectrum band or an unlicensed radio frequency spectrum band, and a set of carriers used in a particular mode of communication may all be received (e.g., at a UE 115) over the licensed radio frequency spectrum band, all be received (e.g., at a UE 115) over the unlicensed radio frequency spectrum band, or be received (e.g., at a UE 115) over a combination of the licensed radio frequency spectrum band and the unlicensed radio frequency spectrum band.

In some embodiments of the wireless communication system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Before a UE 115 may communicate with a base station 105, the UE 115 may need to discover or acquire the base station 105 or cell of the wireless communication system 100. After a UE 115 discovers a base station 105 or cell, the UE 115 may need to periodically synchronize with the base station 105 or cell in order to properly communicate with, and decode communications from, the base station 105. In some examples, a base station 105 may transmit a synchronization signal that a UE 115 may receive and decode to discover and/or synchronize with the base station 105 or cell. In some examples, the synchronization signal may include a primary synchronization signal (PSS), a secondary synchronization signal (SSS), a cell-specific reference signal (CRS, such as an enhanced CRS (eCRS)), and/or a channel state information reference signal (CSI-RS).

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to the unlicensed radio frequency spectrum band, a carrier aggregation mode in which both LTE/LTE-A downlink and uplink communications may be offloaded from the licensed radio frequency spectrum band to the unlicensed radio frequency spectrum band, and/or a standalone mode in which LTE/LTE-A downlink and uplink communications between a base station 105 and a UE 115 may take place in the unlicensed radio frequency spectrum band. Base stations 105 as well as UEs 115 may in some examples support one or more of these or similar modes of operation. In some examples, OFDMA waveforms may be used in the communication links 125 for LTE/LTE-A downlink communications in the licensed radio frequency spectrum band and/or the unlicensed radio frequency spectrum band, while OFDMA, SC-FDMA and/or resource block interleaved FDMA waveforms may be used in the communication links 125 for LTE/LTE-A uplink communications in the licensed radio frequency spectrum band and/or the unlicensed radio frequency spectrum band.

Figure 2:
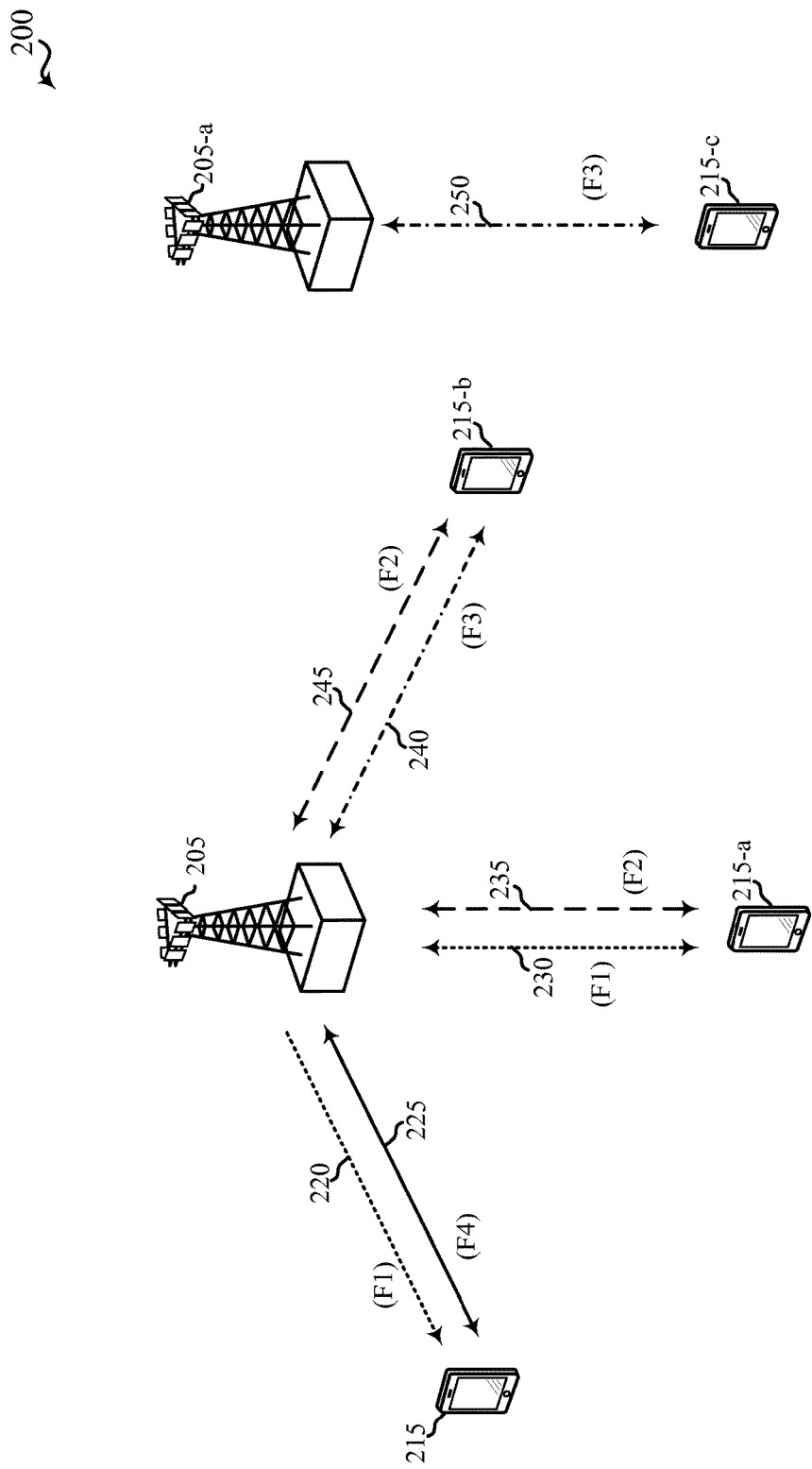
FIG. 2 shows a wireless communication system in which Long Term Evolution (LTE)/LTE-Advanced (LTE-A) may be deployed under different scenarios using an unlicensed radio frequency spectrum band, in accordance with various aspects of the present disclosure.

FIG. 2 shows a wireless communication system 200 in which LTE/LTE-A may be deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-*a* may be examples of aspects of one or more of the base stations 105 described with reference to FIG. 1, while a first UE 215, a second UE 215-*a*, a third UE 215-*b*, and a fourth UE 215-*c* may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum band and needs to relieve some of the traffic and/or signaling congestion.

In one example of a carrier aggregation mode in the wireless communication system 200, the first base station 205 may transmit OFDMA waveforms to the second UE 215-*a* using a second bidirectional link 230 and may receive OFDMA waveforms, SC-FDMA waveforms, and/or resource block interleaved FDMA waveforms from the second UE 215-*a* using the second bidirectional link 230.

The second bidirectional link 230 may be associated with the frequency F1 in the unlicensed radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum band and needs to relieve some of the traffic and/or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, and/or resource block interleaved waveforms from the third UE 215-*b* using the fourth bidirectional link 240. The fourth bidirectional link 240 may be associated with a frequency F3 in the unlicensed radio frequency spectrum band. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, and/or resource block interleaved FDMA waveforms from the fourth UE 215-*c* using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, and/or 205-a described with reference to FIGS. 1 and/or 2, and/or one of the UEs 115, 215, 215-a, 215-b, and/or 215-c described with reference to FIGS. 1 and/or 2, may use a gating interval to gain access to a channel of an unlicensed radio frequency spectrum band (e.g., to a physical channel of the unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of an unlicensed radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve and/or use the channel of the unlicensed radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
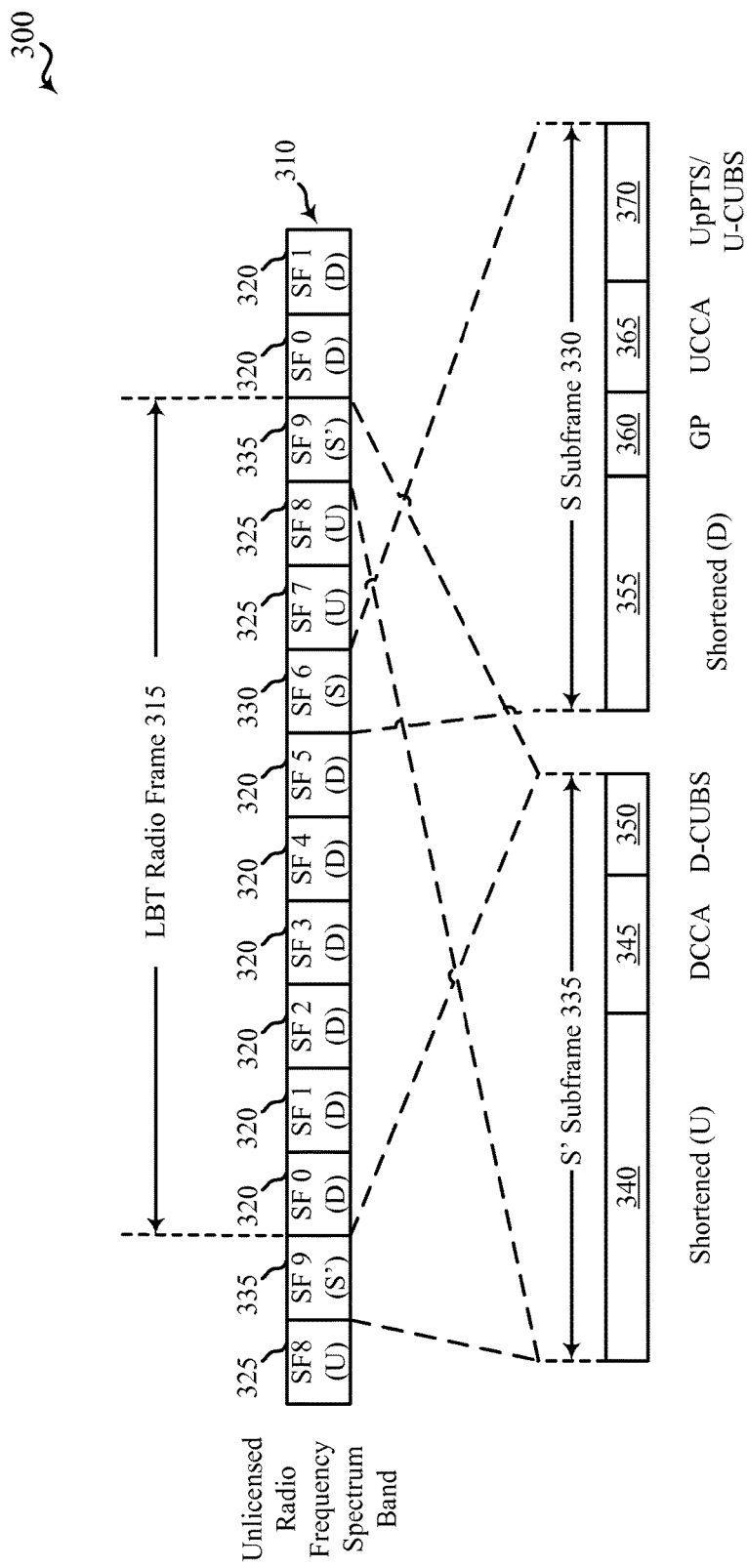
FIG. 3 shows an example of a wireless communication over an unlicensed radio frequency spectrum band, in accordance with various aspects of the present disclosure.

FIG. 3 shows an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink (D) subframes 320 and uplink (U) subframes 325, while the S' subframe 335 may provide a transition between uplink (U) subframes 325 and downlink (D) subframes 320.

During the S' subframe 335, a downlink clear channel assessment (DCCA) procedure 345 may be performed by one or more base stations, such as one or more of the base stations 105, 205, and/or 205-a described with reference to FIGS. 1 and/or 2, to reserve, for a period of time, a channel of the unlicensed radio frequency spectrum band over which the wireless communication 310 occurs. Following a successful DCCA procedure 345 by a base station, the base station may transmit a channel usage beacon signal (CUBS) (e.g., a downlink CUBS (D-CUBS 350)) to provide an indication to other base stations and/or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the unlicensed radio frequency spectrum band and satisfy one or more regulatory requirements (e.g., a requirement that transmissions over the unlicensed radio frequency spectrum band occupy at least 80% of the available frequency bandwidth). The D-CUBS 350 may in some examples take a form similar to that of an LTE/LTE-A CRS and/or a channel state information reference signal (CSI-RS). When the DCCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to the channel of the unlicensed radio frequency spectrum band to transmit the D-CUBS 350.

During the S subframe 330, an uplink CCA (UCCA) procedure 365 may be performed by one or more UEs, such as one or more of the UEs 115, 215, 215-a, 215-b, and/or 215-c described above with reference to FIGS. 1 and/or 2, to reserve, for a period of time, the channel over which the wireless communication 310 occurs. Following a successful UCCA procedure 365 by a UE, the UE may transmit an uplink CUBS (U-CUBS 370) to provide an indication to other UEs and/or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the unlicensed radio frequency spectrum band and satisfy one or more regulatory requirements (e.g., the requirement that transmissions over the unlicensed radio frequency spectrum band occupy at least 80% of the available frequency bandwidth). The U-CUBS 370 may in some examples take a form similar to that of an LTE/LTE-A CRS and/or a CSI-RS. When the UCCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the unlicensed radio frequency spectrum band as an uplink pilot time slot (UpPTS) and/or to transmit the U-CUBS 370.

In some examples, the DCCA procedure 345 and/or the UCCA procedure 365 may include the performance of a single CCA procedure. In other examples, the DCCA procedure 345 and/or the UCCA procedure 365 may include the performance of an extended CCA procedure. The extended CCA procedure may include a random number of CCA procedures, and in some examples may include a plurality of CCA procedures.

Figure 4:
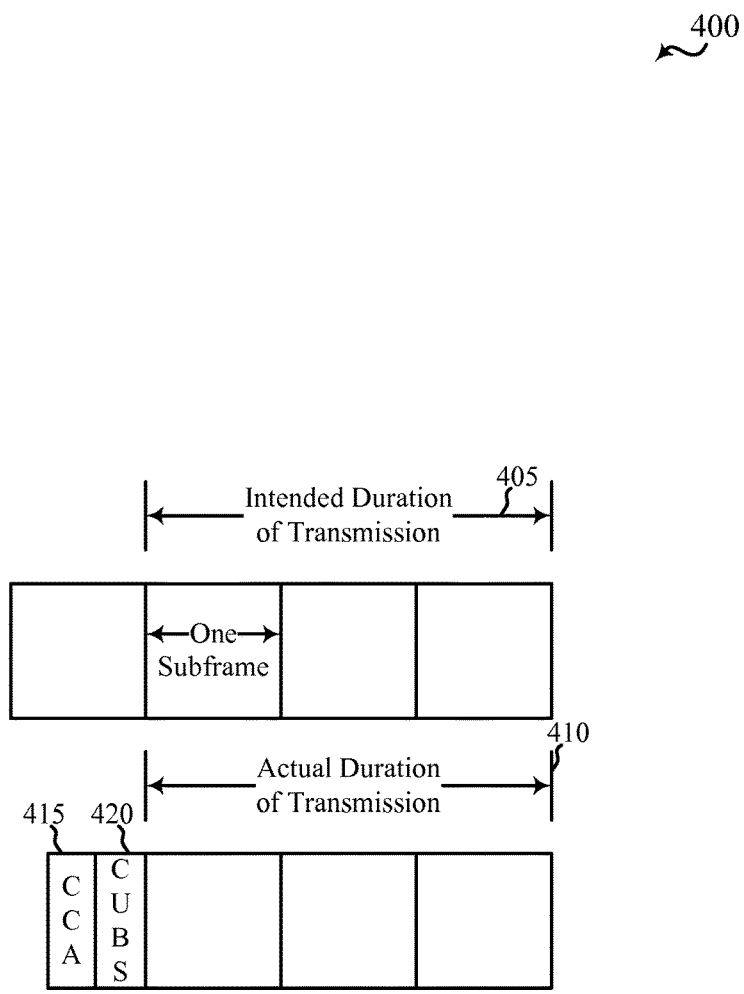
FIG. 4 shows an example of a clear channel assessment (CCA) procedure performed by a transmitting apparatus when contending for access to an unlicensed radio frequency spectrum band, in accordance with various aspects of the present disclosure.

FIG. 4 shows an example 400 of a CCA procedure 415 performed by a transmitting apparatus when contending for access to an unlicensed radio frequency spectrum band, in accordance with various aspects of the present disclosure. In some examples, the CCA procedure 415 may be an example of the DCCA procedure 345 or UCCA procedure 365 described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a CUBS 420 may be transmitted, followed by a data transmission (e.g., an uplink transmission or a downlink transmission). By way of example, the data transmission may have an intended duration 405 of three subframes and an actual duration 410 of three subframes.

Figure 5:
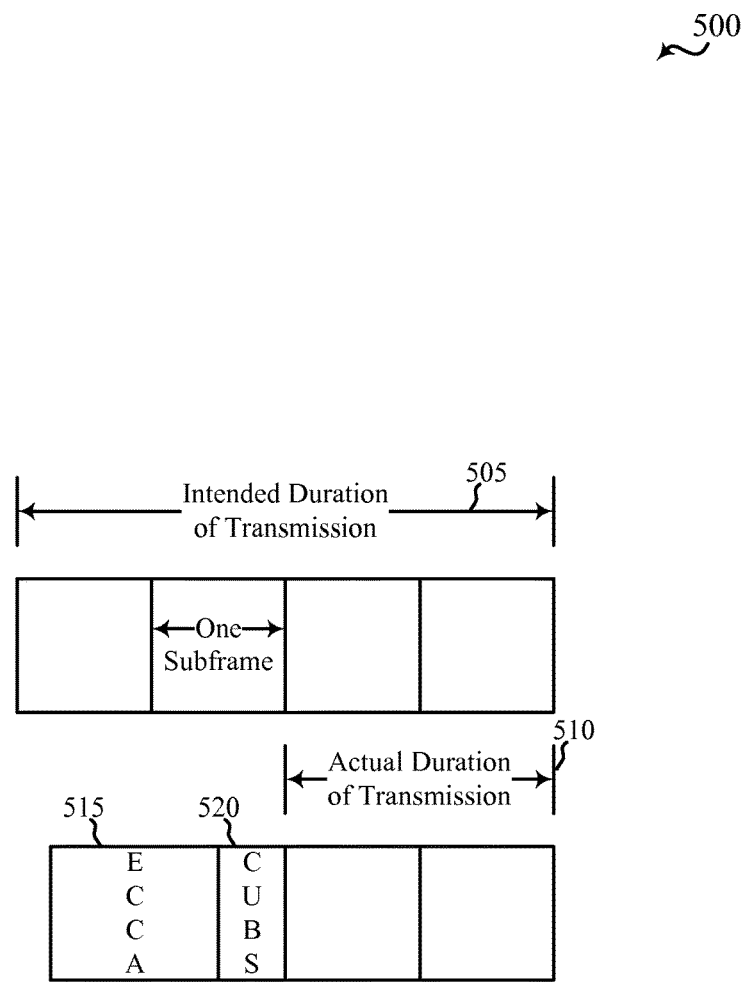
FIG. 5 shows an example of an extended CCA (ECCA) procedure performed by a transmitting apparatus when contending for access to an unlicensed radio frequency spectrum band, in accordance with various aspects of the present disclosure.

FIG. 5 shows an example 500 of an extended CCA (ECCA) procedure 515 performed by a transmitting apparatus when contending for access to an unlicensed radio frequency spectrum band, in accordance with various aspects of the present disclosure. In some examples, the ECCA procedure 515 may be an example of the DCCA procedure 345 or UCCA procedure 365 described with reference to FIG. 3. The ECCA procedure 515 may include a random number of CCA procedures, and in some examples may include a plurality of CCA procedures. The ECCA procedure 515 may therefore have a variable duration. In some examples, the ECCA procedure 515 may be performed in accordance with an LBT-load based equipment (LBT-LBE) protocol (e.g., the LBT-LBE protocol described by EN 301 893). The ECCA procedure 515 may provide a greater likelihood of winning contention to access the unlicensed radio frequency spectrum band, but at a potential cost of a shorter data transmission. Following the ECCA procedure 515, a CUBS 520 may be transmitted, followed by a data transmission. By way of example, the data transmission may have an intended duration 505 of four subframes and an actual duration 510 of two subframes.

In some examples, a wireless communication over an unlicensed radio frequency spectrum band may be made without first performing a CCA procedure (e.g., without first performing the DCCA procedure 345 and/or the UCCA procedure 365 described with reference to FIG. 3). A wireless communication made over an unlicensed radio frequency spectrum band without first performing a CCA procedure may be referred to as a CCA-Exempt Transmission (CET). To minimize contention over an unlicensed radio frequency spectrum band, a CET may be transmitted according to a CET period, which CET period may have a duration that is longer, and in some examples much longer, than a duration of an LBT radio frame. For example, for an LBT radio frame having a duration of ten milliseconds (10 ms), a CET may be transmitted according to a CET period having a duration of eighty milliseconds (80 ms). In some examples, a CET period may have a configurable periodicity. In some examples, a CET may have a duration equal to or less than the duration of an LBT radio frame.

In some examples, a base station such as one of the base stations 105, 205, and/or 205-a described with reference to FIGS. 1 and/or 2 may have guaranteed access to a licensed radio frequency spectrum band and may transmit synchronization signals over the licensed radio frequency spectrum band on a regular, periodic basis (e.g., during an LBT radio frame such as the LBT radio frame 315 described with reference to FIG. 3). However, some base stations 105 may not have access to a licensed radio frequency spectrum band, and/or some UEs 115 may not have access to (or be capable of communicating over) a licensed radio frequency spectrum band. In these latter examples, the base station 105 may have access to an unlicensed radio frequency spectrum band. However, because the base station 105 may be configured to contend for access to the unlicensed radio frequency spectrum band, the base station's transmission of synchronization signals over the unlicensed radio frequency spectrum band may be irregular and/or less frequent (e.g., due to frames and/or periods in which the base station 105 is unable to successfully contend for access to the unlicensed radio frequency spectrum band). This description describes techniques for transmitting and receiving synchronization signals over an unlicensed radio frequency spectrum band, within a time window.

Figure 6:
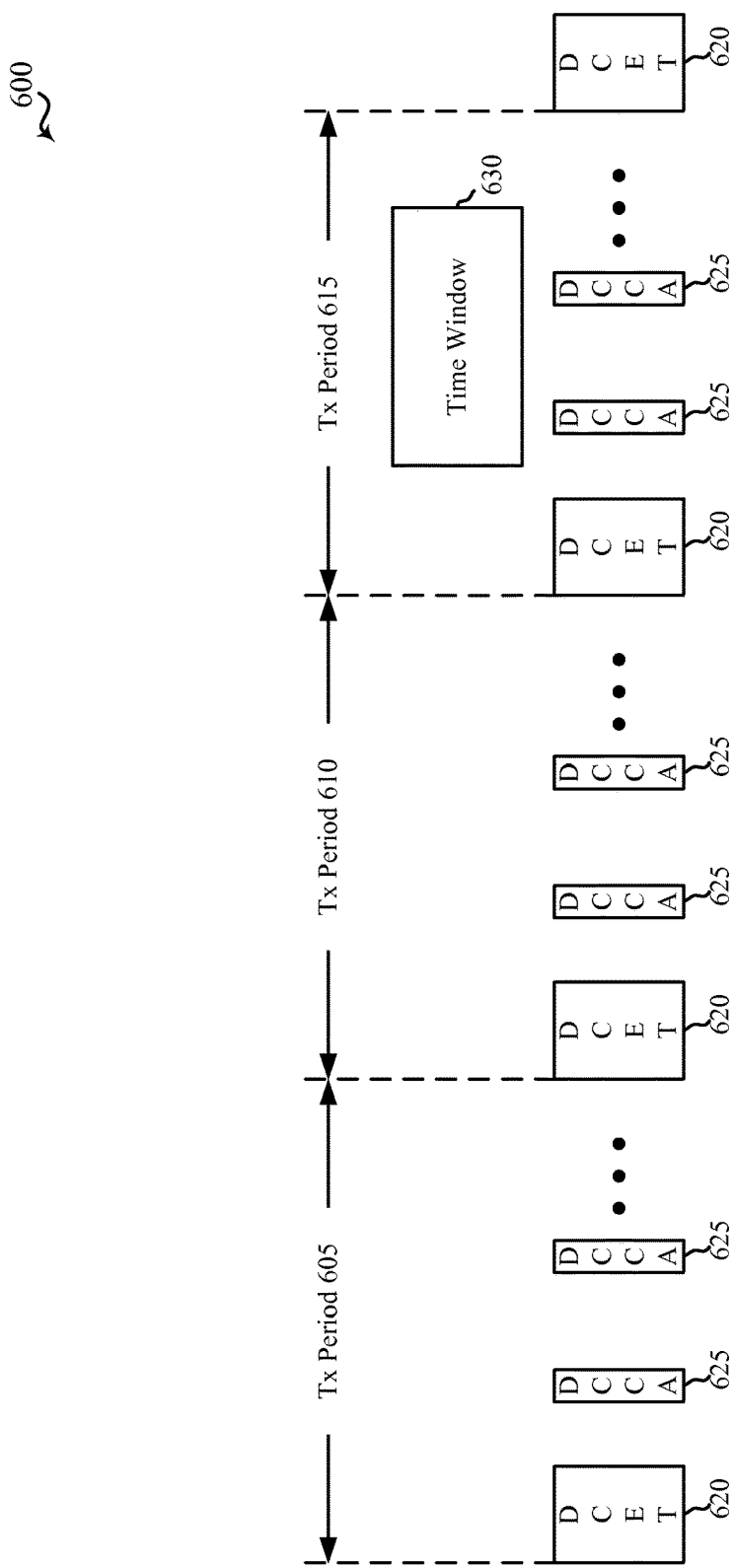
FIG. 6 shows an example of transmissions made by a base station over an unlicensed radio frequency spectrum band, in accordance with various aspects of the present disclosure.

FIG. 6 shows an example 600 of transmissions made by a base station over an unlicensed radio frequency spectrum band, in accordance with various aspects of the present disclosure. In some examples, the base station making the transmissions may be an example of aspects of one or more of the base stations 105, 205, and/or 205-a described with reference to FIGS. 1 and/or 2.

By way of example, FIG. 6 illustrates transmissions made by a base station over time, in three adjacent transmission (Tx) periods. The three adjacent transmission periods include a first transmission period 605, a second transmission period 610, and a third transmission period 615. Transmissions made during the Tx periods may be a CET or a transmission subject to LBT.

The transmissions made by the base station may include synchronous transmissions made during downlink CETs (DCETs 620) of the base station, synchronous transmissions made during periodic fixed subframe locations (e.g., following successful DCCAs 625), and asynchronous transmissions made during a time window 630. Each of the DCETs 620 may be an example of one of the CETs described with reference to FIG. 5.

The time window 630 may be provided in each of the first Tx period 605, the second Tx period 610, and the third Tx period 615; once every N Tx periods (where N>1); or in one or more Tx periods on a dynamic basis. FIG. 6 shows the time window 630 occurring every N Tx periods and falling in the third Tx period 615. In some examples, multiple instances of the time window 630 may be provided in each of one or more Tx periods. The length or duration of the time window 630 may be shorter or longer than shown. In some examples, the time window 630 may overlap in time with at least one periodic fixed subframe location (e.g., at least one subframe following a DCCA 625). In some examples, the time window 630 may be associated with a different set of subcarrier frequencies of the unlicensed radio frequency spectrum band than the set of subcarrier frequencies included in a DCET 620, a DCCA 625, or a periodic fixed subframe following a DCCA 625.

In some examples, an indication of the time window 630 (e.g., an indication of when the time window 630 starts (e.g., a subframe number and/or OFDM symbol period number) and/or ends, an indication of the duration of the time window 630, and/or an indication of the frequency subcarriers included in the time window 630) may be transmitted by the base station. The indication of the time window 630 may in some examples be transmitted during a system information block (SIB), a master information block (MIB), and/or inside or outside the time window 630. In some examples, the indication of the time window 630 may be transmitted in an RRC message.

In some examples, a synchronization signal may be transmitted by the base station during one or more of the DCETs 620, during one or more periodic fixed subframe locations (e.g., following one or more successful DCCAs 625), and/or during the time window 630. A transmission of a synchronization signal during a DCET 620 or during a periodic fixed subframe may be considered a synchronous transmission, whereas a transmission of a synchronization signal during the time window 630 may be considered an asynchronous transmission. A transmission of a synchronization signal subject to CCA during a periodic fixed subframe location may also be considered an opportunistic transmission, because it may depend on the successful performance of a DCCA 625 preceding the periodic fixed subframe location. In some examples, a transmitted synchronization signal may be used for cell discovery, synchronization, and/or other purposes. In some examples, a transmitted synchronization signal may include a PSS, an SSS, a CRS (e.g., an eCRS), and/or a CSI-RS.

When a synchronization signal is transmitted during the time window 630, the synchronization signal may be transmitted at a transmission time following one or more successful DCCAs performed during the time window 630. The DCCAs performed during the time window 630 may differ from the DCCAs 625. In some examples, a number of DCCAs may be performed during the time window 630, and a synchronization signal may be transmitted at a transmission time that follows a first successful one of the DCCAs. In some examples, a number of DCCAs may be performed during the time window 630, and a synchronization signal may be transmitted following a last unsuccessful one of the DCCAs performed during the time window, and/or at a transmission time occurring at an end of the time window 630. In some examples, the number of DCCAs may be configured, for example, based on power savings, observed channel interference, etc. In some examples, a DCCA may not be performed unless less than five percent of a channel bandwidth is occupied by a DCET 620 within a configurable period (e.g., 50 milliseconds (ms)).

A synchronization signal transmitted during the time window 630 may be considered asynchronous for various reasons—e.g., because the synchronization signal may be transmitted at a transmission time following one or multiple DCCAs, and/or because the start, end, or duration of the time window 630 may not be synchronized with a radio frame structure, LBT frame structure, and/or subframe structure to which the DCETs 620, the DCCAs 625, and/or the fixed periodic subframe locations following the DCCAs 625 are synchronized.

In some examples, the base station may transmit downlink control information (DCI) for a subframe in which a synchronization signal is transmitted. The DCI may indicate the resources (e.g., subframe, OFDM symbol(s), resource elements, used to transmit the synchronization signal and ensure proper rate matching. Also or alternatively, the base station may transmit an enhanced physical downlink control channel (ePDCCH) indicating the presence of a synchronization signal in a subframe, to ensure proper rate matching.

In some examples, the base station may transmit timing information during the time window. In some examples, the timing information may include an indication of a current frame of the base station, a current subframe of the base station, and/or a current symbol (e.g., information that associates an asynchronously transmitted synchronization signal with a synchronous reference). Also or alternatively, the base station may transmit system information for the base station during the time window. In some examples, the system information may be transmitted in a SIB and/or a MIB.

In an alternative to what is shown and described with reference to FIG. 6, a base station may transmit a synchronization signal and timing information over the unlicensed radio frequency spectrum band, without defining a time window for its transmission, and/or without transmitting an indication of the time window 630. In yet another alternative, a UE may receive an transmitted synchronization signal without receiving an indication of the time window 630. In any of these alternatives, a base station may transmit a synchronization signal and timing information over the unlicensed radio frequency spectrum band (e.g., transmit a synchronization signal and timing information together over the unlicensed radio frequency spectrum band), and the timing information may be used by a UE as a synchronous reference for interpreting the synchronization signal.

In some examples, the base station may transmit an indication or indications of one or more additional time windows. The one or more additional time windows may indicate when a UE in communication with the base station (e.g., as a serving cell) should monitor the unlicensed radio frequency spectrum band to receive one or more synchronization signals transmitted by one or more neighboring cells.

Figure 7:
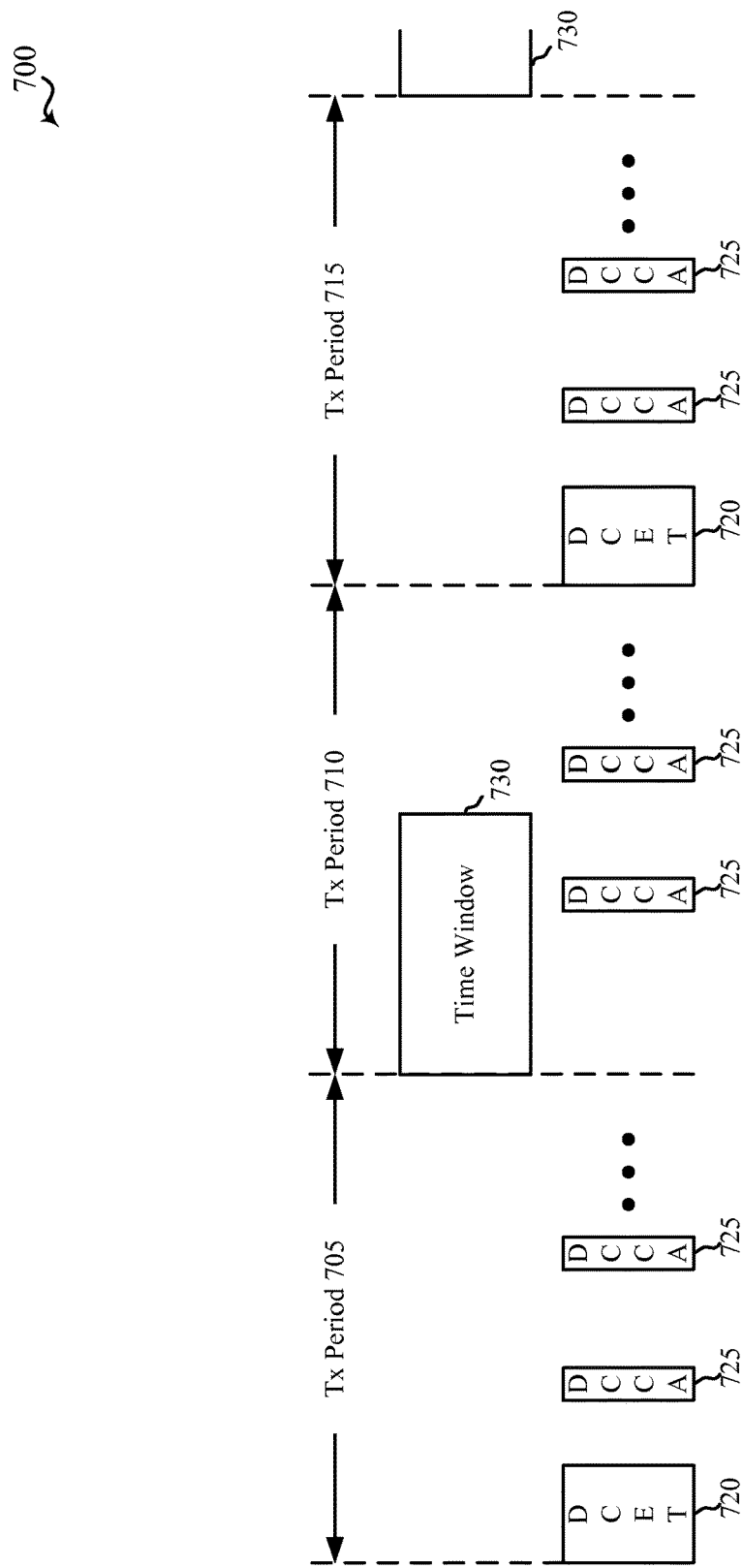
FIG. 7 shows an example of transmissions made by a base station over an unlicensed radio frequency spectrum band, in accordance with various aspects of the present disclosure.

FIG. 7 shows an example 700 of transmissions made by a base station over an unlicensed radio frequency spectrum band, in accordance with various aspects of the present disclosure. In some examples, the base station making the transmissions may be an example of aspects of one or more of the base stations 105, 205, and/or 205-a described with reference to FIGS. 1 and/or 2.

By way of example, FIG. 7 illustrates transmissions made by a base station over time, in three adjacent transmission (Tx) periods. The three adjacent Tx periods include a first Tx period 705, a second Tx period 710, and a third Tx period 715. Transmissions made during the Tx periods may be a CET or a transmission subject to LBT.

The transmissions made by the base station may include synchronous transmissions made during downlink CETs (DCETs 720) of the base station, synchronous transmissions made during periodic fixed subframe locations (e.g., following successful DCCAs 725), and asynchronous transmissions made during a time window 730. Each of the DCETs 720 may be an example of one of the CETs described with reference to FIG. 5.

The time window 730 may be provided in each of the first Tx period 705, the second Tx period 710, and the third Tx period 715; once every N Tx periods (where N>1); or in one or more Tx periods on a dynamic basis. FIG. 7 shows the time window 730 occurring every N Tx periods, or on a dynamic basis, in the second Tx period 710. The length or duration of the time window 730 may be shorter or longer than shown. In some examples, the time window 730 may overlap in time with at least one periodic fixed subframe location (e.g., at least one subframe following a DCCA 725). In some examples, the time window 730 may be associated with a different set of subcarrier frequencies of the unlicensed radio frequency spectrum band than the set of subcarrier frequencies included in a DCET 720, a DCCA 725, or a periodic fixed subframe following a DCCA 725.

In some examples, an indication of the time window 730 (e.g., an indication of when the time window 730 starts (e.g., a subframe number and/or OFDM symbol period number) and/or ends, an indication of the duration of the time window 730, and/or an indication of the frequency subcarriers included in the time window 730) may be transmitted by the base station. The indication of the time window 730 may in some examples be transmitted during a system information block (SIB), a master information block (MIB), and/or inside or outside the time window 730. In some examples, the indication of the time window 730 may be transmitted in an RRC message.

In some examples, a synchronization signal may be transmitted by the base station during one or more of the DCETs 720, during one or more periodic fixed subframe locations (e.g., following one or more successful DCCAs 725), and/or during the time window 730. A transmission of a synchronization signal during a DCET 720 or during a periodic fixed subframe may be considered a synchronous transmission, whereas a transmission of a synchronization signal during the time window 730 may be considered an asynchronous transmission. A transmission of a synchronization signal subject to CCA during a periodic fixed subframe location may also be considered an opportunistic transmission, because it may depend on the successful performance of a DCCA 725 preceding the periodic fixed subframe location. In some examples, a transmitted synchronization signal may be used for cell discovery, synchronization, and/or other purposes. In some examples, a transmitted synchronization signal may include a PSS, an SSS, and/or a CRS (e.g., an eCRS).

In some examples, the base station may attempt to transmit a synchronization signal at a transmission time coinciding with a DCET 720, but after the successful performance of a number of DCCAs instead of as a DCET. When a successful DCCA cannot be performed during the DCET 720, the base station may continue to perform DCCAs during the time window 730, and transmit the synchronization signal upon the successful performance of a DCCA, or upon performing all of the number of DCCAs (e.g., all of the DCCAs during the time window 730) without success. The DCCAs performed during the time window 730 may differ from the DCCAs 725. In some examples, the number of DCCAs may be configured, for example, based on power savings, observed channel interference, etc. In some examples, a DCCA may not be performed unless less than five percent of a channel bandwidth is occupied by a DCET 720 within a configurable period (e.g., 50 milliseconds (ms)).

A synchronization signal transmitted during the time window 730 may be considered asynchronous for various reasons—e.g., because the synchronization signal may be transmitted at a transmission time following one or multiple DCCAs, and/or because the start, end, or duration of the time window 730 may not be synchronized with a radio frame structure, LBT frame structure, and/or subframe structure to which the DCETs 720, the DCCAs 725, and/or the fixed periodic subframe locations following the DCCAs 725 are synchronized.

In some examples, the base station may transmit DCI for a subframe in which a synchronization signal is transmitted. The DCI may indicate the resources (e.g., subframe, OFDM symbol(s), resource elements, used to transmit the synchronization signal and ensure proper rate matching. Also or alternatively, the base station may transmit an ePDCCH indicating the presence of a synchronization signal in a subframe, to ensure proper rate matching.

In some examples, the base station may transmit timing information during the time window. In some examples, the timing information may include an indication of a current frame of the base station, a current subframe of the base station, and/or a current symbol (e.g., information that associates an asynchronously transmitted synchronization signal with a synchronous reference). Also or alternatively, the base station may transmit system information for the base station during the time window. In some examples, the system information may be transmitted in a SIB and/or a MIB.

In an alternative to what is shown and described with reference to FIG. 7, a base station may transmit a synchronization signal and timing information over the unlicensed radio frequency spectrum band, without defining a time window for its transmission, and/or without transmitting an indication of the time window 730. In yet another alternative, a UE may receive an transmitted synchronization signal without receiving an indication of the time window 730. In any of these alternatives, a base station may asynchronously transmit a synchronization signal and timing information over the unlicensed radio frequency spectrum band (e.g., transmit a synchronization signal and timing information together over the unlicensed radio frequency spectrum band), and the timing information may be used by a UE as a synchronous reference for interpreting the synchronization signal.

In some examples, the base station may transmit an indication or indications of one or more additional time windows. The one or more additional time windows may indicate when a UE in communication with the base station (e.g., as a serving cell) should monitor the unlicensed radio frequency spectrum band to receive one or more synchronization signals transmitted by one or more neighboring cells.

Figure 8:
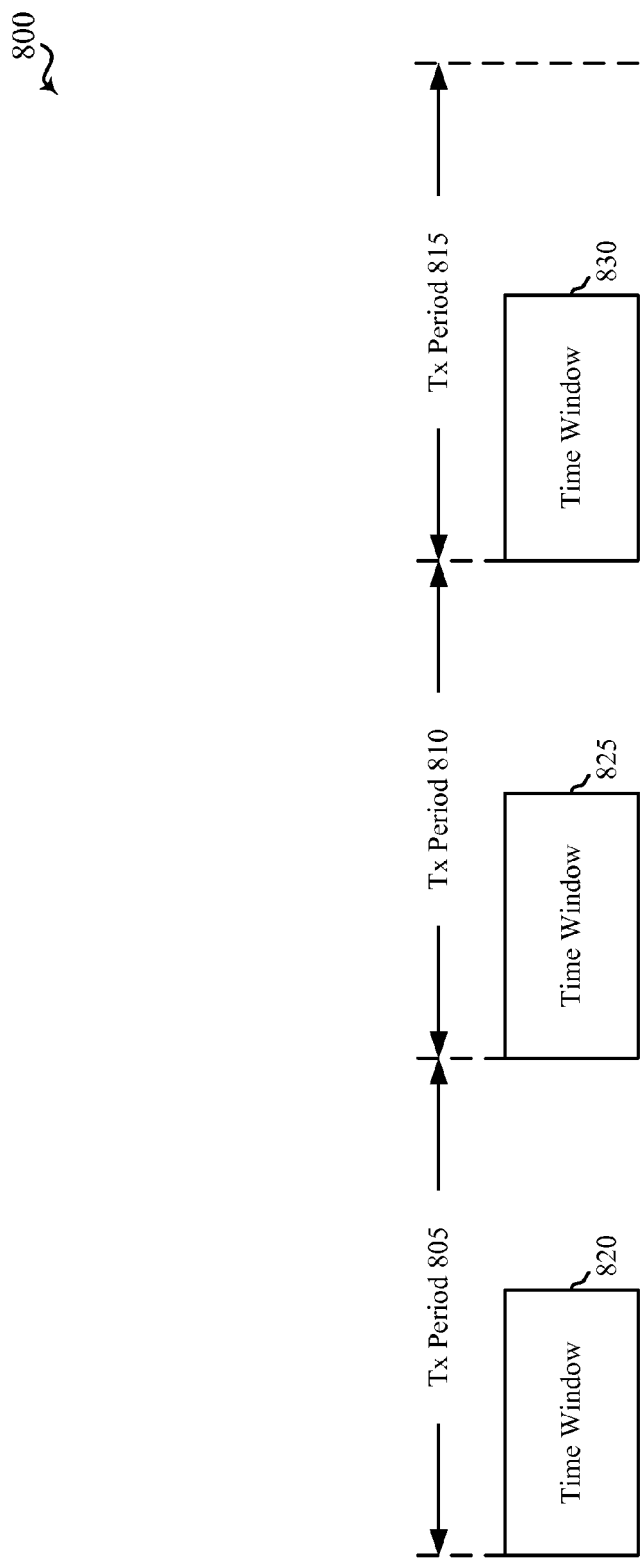
FIG. 8 shows an example of transmissions made by a base station over an unlicensed radio frequency spectrum band, in accordance with various aspects of the present disclosure.

FIG. 8 shows an example 800 of transmissions made by a base station over an unlicensed radio frequency spectrum band, in accordance with various aspects of the present disclosure. In some examples, the base station making the transmissions may be an example of aspects of one or more of the base stations 105, 205, and/or 205-*a* described with reference to FIGS. 1 and/or 2.

By way of example, FIG. 8 illustrates transmissions made by a base station over time, in three adjacent transmission (Tx) periods. The three adjacent Tx periods include a first Tx period 805, a second Tx period 810, and a third Tx period 815. Transmissions made during the Tx periods may be a CET or a transmission subject to LBT.

The transmissions made by the base station may include synchronous or asynchronous transmissions made during a first time window 820, a second time window 825, and a third time window 830. The length or duration of each of the first time window 820, the second time window 825, and the third time window 830 may be shorter or longer than shown.

In some examples, an indication of the first time window 820, the second time window 825, and/or the third time window 830 (e.g., an indication of when the time window starts (e.g., a subframe number and/or OFDM symbol period number) and/or ends, an indication of the duration of the time window, and/or an indication of the frequency subcarriers included in the time window) may be transmitted by the base station. Each indication may in some examples be transmitted during a system information block (SIB), a master information block (MIB), and/or inside or outside the first time window 820, the second time window 825, and/or the third time window 830. In some examples, the indication(s) may be transmitted in one or more RRC messages.

In some examples, a synchronization signal may be transmitted by the base station during one or more of the first time window 820, the second time window 825, and/or the third time window 830. A transmission of a synchronization signal during the first time window 820, the second time window 825, and/or the third time window 830 may be considered an asynchronous transmission. In some examples, a transmitted synchronization signal may be used for cell discovery, synchronization, and/or other purposes. In some examples, a transmitted synchronization signal may include a PSS, an SSS, a CRS (e.g., an eCRS), and/or a CSI-RS.

When a synchronization signal is transmitted during one or more of the first time window 820, the second time window 825, and/or the third time window 830, the synchronization signal may be transmitted at a transmission time following one or more successful DCCAs performed during the time window. In some examples, a number of DCCAs may be performed during the time window, and a synchronization signal may be transmitted at a transmission time that follows a first successful one of the DCCAs. In some examples, a number of DCCAs may be performed during the time window, and a synchronization signal may be transmitted following a last unsuccessful one of the DCCAs performed during the time window, and/or at a transmission time occurring at an end of the time window. In some examples, the number of DCCAs may be configured, for example, based on power savings, observed channel interference, etc. In some examples, a DCCA may not be performed unless less than five percent of a channel bandwidth is occupied by a DCET within a configurable period (e.g., 50 milliseconds (ms)).

A synchronization signal transmitted during the first time window 820, the second time window 825, and/or the third time window 830 may be considered asynchronous for various reasons—e.g., because the synchronization signal may be transmitted at a transmission time following one or multiple DCCAs, and/or because the start, end, or duration of the time window may not be synchronized with a radio frame structure and/or LBT frame structure.

In some examples, the base station may transmit DCI for a subframe in which a synchronization signal is transmitted and ensure proper rate matching. The DCI may indicate the resources (e.g., subframe, OFDM symbol(s), resource elements, used to transmit the synchronization signal. Also or alternatively, the base station may transmit an ePDCCH indicating the presence of a synchronization signal in a subframe, to ensure proper rate matching.

In some examples, the base station may transmit timing information during the time window. In some examples, the timing information may include an indication of a current frame of the base station, a current subframe of the base station, and/or a current symbol (e.g., information that associates an asynchronously transmitted synchronization signal with a synchronous reference). Also or alternatively, the base station may transmit system information for the base station during the time window. In some examples, the system information may be transmitted in a SIB and/or a MIB.

In an alternative to what is shown and described with reference to FIG. 8, a base station may asynchronously transmit a synchronization signal and timing information over the unlicensed radio frequency spectrum band, without defining a time window for its transmission, and/or without transmitting an indication of a time window. In yet another alternative, a UE may receive an asynchronously transmitted synchronization signal without receiving an indication of a time window. In any of these alternatives, a base station may asynchronously transmit a synchronization signal and timing information over the unlicensed radio frequency spectrum band (e.g., transmit a synchronization signal and timing information together over the unlicensed radio frequency spectrum band), and the timing information may be used by a UE as a synchronous reference for interpreting the synchronization signal.

In some examples, the base station may transmit an indication or indications of one or more additional time windows. The one or more additional time windows may indicate when a UE in communication with the base station (e.g., as a serving cell) should monitor the unlicensed radio frequency spectrum band to receive one or more synchronization signals transmitted by one or more neighboring cells.

Figure 9:
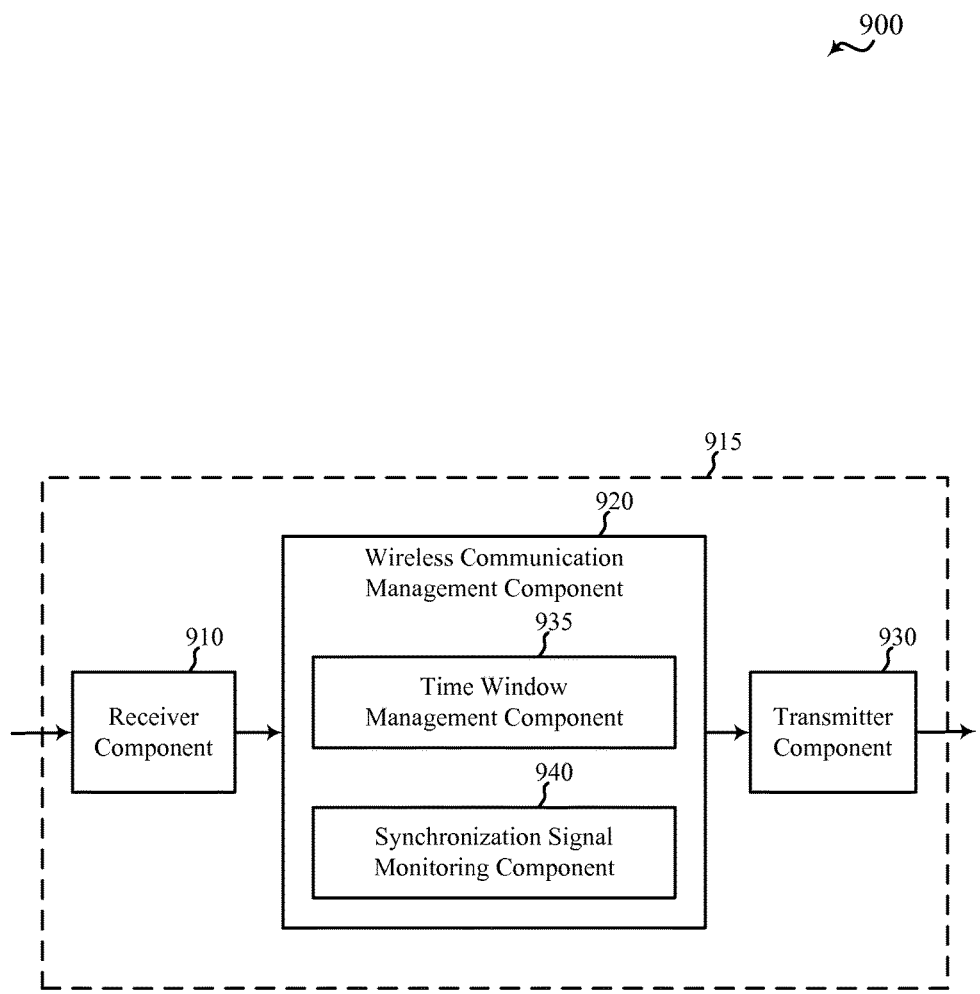
FIG. 9 shows a block diagram of an apparatus for use in wireless communication, in accordance with various aspects of the present disclosure.

FIG. 9 shows a block diagram 900 of an apparatus 915 for use in wireless communication, in accordance with various aspects of the present disclosure. The apparatus 915 may be an example of aspects of one or more of the UEs 115, 215, 215-a, 215-b, and/or 215-c described with reference to FIGS. 1 and/or 2. The apparatus 915 may also be or include a processor. The apparatus 915 may include a receiver component 910, a wireless communication management component 920, and/or a transmitter component 930. Each of these components may be in communication with each other.

The components of the apparatus 915 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors. In some examples, the components as shown in FIG. 9 each may be executed in a dedicated hardware (e.g., a circuit or circuitry) for performing the functions described herein.

In some examples, the receiver component 910 may include at least one radio frequency (RF) receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver component 910 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter component 930 may include at least one RF transmitter, such as at least one RF transmitter operable to transmit over the licensed radio frequency spectrum band and/or the unlicensed radio frequency spectrum band. The transmitter component 930 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management component 920 may be used to manage one or more aspects of wireless communication for the apparatus 915. In some examples, the wireless communication management component 920 may include a time window management component 935 and/or a synchronization signal monitoring component 940.

In some examples, the time window management component 935 be used to receive, over an unlicensed radio frequency spectrum band and via the receiver component 910, an indication of a time window associated with an asynchronous transmission of a synchronization signal. In some examples, the indication of the time window may be received in a SIB and/or a MIB. In some examples, the indication of the time window may be received in an RRC message. In some examples, the synchronization signal may include a PSS, an SSS, a CRS (e.g., an eCRS), and/or a CSI-RS.

In some examples, the synchronization signal monitoring component 940 may be used to monitor the unlicensed radio frequency spectrum band during the time window, to receive the synchronization signal from a base station (e.g., a base station of an eNB, such as one of the base stations 105, 205, and/or 205-a described with reference to FIGS. 1 and/or 2).

Figure 10:
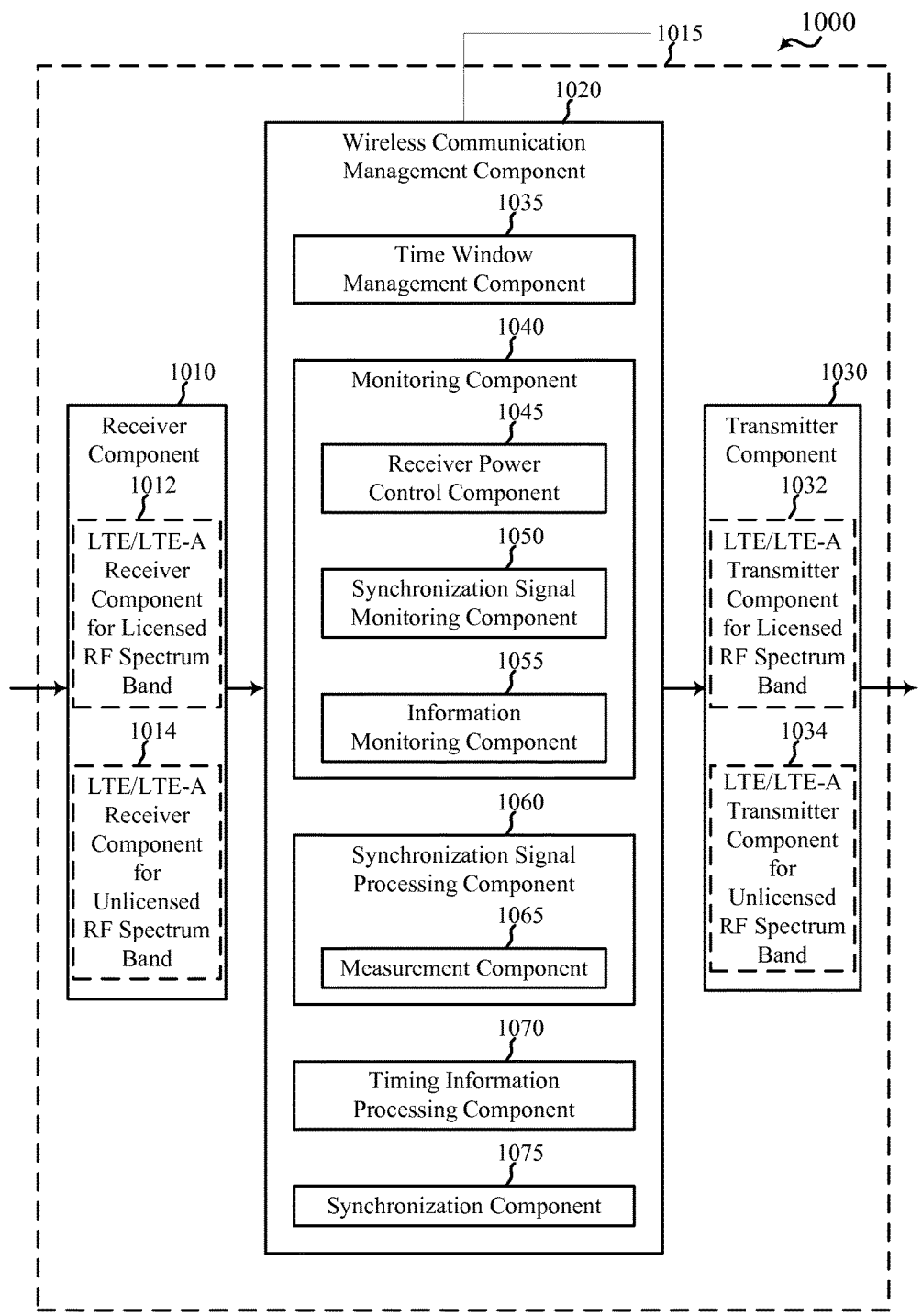
FIG. 10 shows a block diagram of an apparatus for use in wireless communication, in accordance with various aspects of the present disclosure.

FIG. 10 shows a block diagram 1000 of an apparatus 1015 for use in wireless communication, in accordance with various aspects of the present disclosure. The apparatus 1015 may be an example of aspects of one or more of the UEs 115, 215, 215-a, 215-b, and/or 215-c described with reference to FIGS. 1 and/or 2, and/or an example of aspects of the apparatus 915 described with reference to FIG. 9. The apparatus 1015 may also be or include a processor. The apparatus 1015 may include a receiver component 1010, a wireless communication management component 1020, and/or a transmitter component 1030. Each of these components may be in communication with each other.

The components of the apparatus 1015 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. In some examples, the components as shown in FIG. 10 each may be executed in a dedicated hardware (e.g., a circuit or circuitry) for performing the functions described herein.

In some examples, the receiver component 1010 may include at least one radio RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver component 1010 may in some cases include separate receivers for the licensed radio frequency spectrum band and the unlicensed radio frequency spectrum band. The separate receivers may, in some examples, take the form of an LTE/LTE-A receiver component for communicating over the licensed radio frequency spectrum band (e.g., LTE/LTE-A receiver component for licensed RF spectrum band 1012), and an LTE/LTE-A receiver component for communicating over the unlicensed radio frequency spectrum band (e.g., LTE/LTE-A receiver component for unlicensed RF spectrum band 1014). The receiver component 1010, including the LTE/LTE-A receiver component for licensed RF spectrum band 1012 and/or the LTE/LTE-A receiver component for unlicensed RF spectrum band 1014, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter component 1030 may include at least one RF transmitter, such as at least one RF transmitter operable to transmit over the licensed radio frequency spectrum band and/or the unlicensed radio frequency spectrum band. The transmitter component 1030 may in some cases include separate transmitters for the licensed radio frequency spectrum band and the unlicensed radio frequency spectrum band. The separate transmitters may, in some examples, take the form of an LTE/LTE-A transmitter component for communicating over the licensed radio frequency spectrum band (e.g., LTE/LTE-A transmitter component for licensed RF spectrum band 1032), and an LTE/LTE-A transmitter component for communicating over the unlicensed radio frequency spectrum band (e.g., LTE/LTE-A transmitter component for unlicensed RF spectrum band 1034). The transmitter component 1030, including the LTE/LTE-A transmitter component for licensed RF spectrum band 1032 and/or the LTE/LTE-A transmitter component for unlicensed RF spectrum band 1034, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management component 1020 may be used to manage one or more aspects of wireless communication for the apparatus 1015. In some examples, the wireless communication management component 1020 may include a time window management component 1035, a monitoring component 1040, a synchronization signal processing component 1060, a timing information processing component 1070, and/or a synchronization component 1075.

In some examples, the time window management component 1035 be used to receive, over an unlicensed radio frequency spectrum band and via the receiver component 1010, an indication of a time window associated with an asynchronous transmission of a synchronization signal. In some examples, the indication of the time window may be received in a SIB and/or a MIB. In some examples, the indication of the time window may be received in an RRC message. In some examples, the time window may replace at least one CET of a base station.

In some examples, the monitoring component 1040 may be used to monitor a licensed radio frequency spectrum band and/or an unlicensed radio frequency spectrum band for transmitted signals. In some examples, the monitoring component 1040 may include a receiver power control component 1045, a synchronization signal monitoring component 1050, and/or an information monitoring component 1055. In some examples, the receiver power control component 1045 may be used to wake up the apparatus 1015 or the receiver component 1010 (e.g., the LTE/LTE-A receiver component for unlicensed RF spectrum band 1014) from a sleep state prior to an expected transmission over a corresponding radio frequency spectrum band (e.g., the unlicensed radio frequency spectrum band). The receiver power control component 1045 may also be used to place the apparatus 1015 or the receiver component 1010 in a sleep state (e.g., a low power state or an OFF state) following the receipt of a transmission over a corresponding radio frequency spectrum band. In some examples, a transmission may be expected during a time window managed by the time window management component 1035, during a CET of a base station, or during a periodic fixed subframe location.

In some examples, the synchronization signal monitoring component 1050 may be used to monitor the unlicensed radio frequency spectrum band during a time window managed by the time window management component 1035, to receive the synchronization signal from a base station (e.g., a base station of an eNB, such as one of the base stations 105, 205, and/or 205-a described with reference to FIGS. 1 and/or 2). In some examples, the synchronization signal monitoring component 1050 may also or alternatively be used to monitor the unlicensed radio frequency spectrum band during a CET of the base station, and/or during a periodic fixed subframe location.

In some examples, the information monitoring component 1055 may be used to receive, during a time window managed by the time window management component 1035, timing information from a base station. Also or alternatively, the information monitoring component 1055 may be used to receive system information for the base station during the time window. The system information may be received in a SIB and/or a MIB.

In some examples, the synchronization signal processing component 1060 may be used to process a synchronization signal discovered by the synchronization signal monitoring component 1050. In some examples, the synchronization signal may include a PSS, an SSS, a CRS (e.g., an eCRS), and/or a CSI-RS. In some examples, the synchronization signal processing component 1060 may include a measurement component 1065. In some examples, the measurement component 1065 may be used to performing radio resource management (RRM) measurements on a synchronization signal.

In some examples, the timing information processing component 1070 may be used to process timing information discovered by the information monitoring component 1055. In some examples, the timing information may include an indication of a current frame of the base station, a current subframe of the base station, and/or a current symbol.

In some examples, the synchronization component 1075 may be used to synchronize the apparatus 1015 with a base station based at least in part on received timing information and/or RRM measurements performed by the measurement component 1065.

Figure 11:
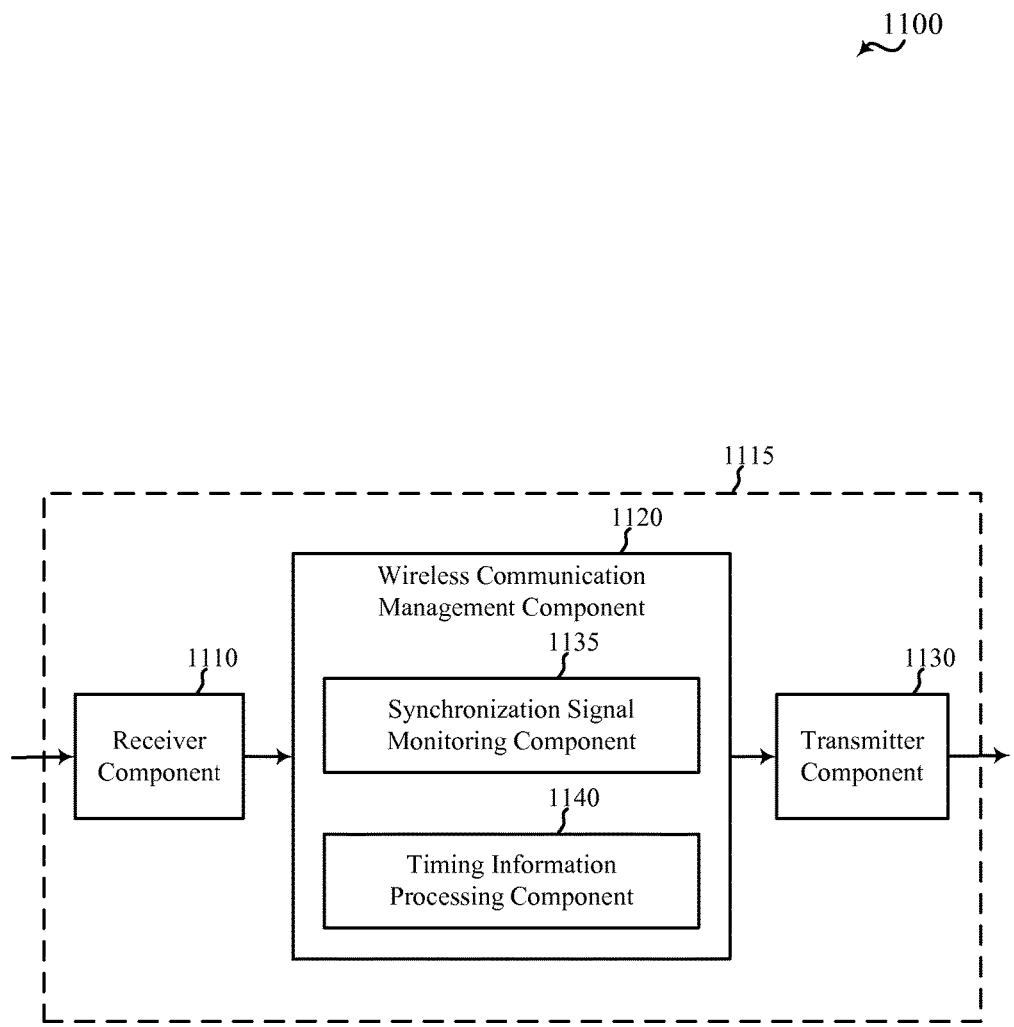
FIG. 11 shows a block diagram of an apparatus for use in wireless communication, in accordance with various aspects of the present disclosure.

FIG. 11 shows a block diagram 1100 of an apparatus 1115 for use in wireless communication, in accordance with various aspects of the present disclosure. The apparatus 915 may be an example of aspects of one or more of the UEs 115, 215, 215-a, 215-b, and/or 215-c described with reference to FIGS. 1 and/or 2. The apparatus 1115 may also be or include a processor. The apparatus 1115 may include a receiver component 1110, a wireless communication management component 1120, and/or a transmitter component 1130. Each of these components may be in communication with each other.

The components of the apparatus 1115 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. In some examples, the components as shown in FIG. 11 each may be executed in a dedicated hardware (e.g., a circuit or circuitry) for performing the functions described herein.

In some examples, the receiver component 1110 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver component 1110 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter component 1130 may include at least one RF transmitter, such as at least one RF transmitter operable to transmit over the licensed radio frequency spectrum band and/or the unlicensed radio frequency spectrum band. The transmitter component 1130 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management component 1120 may be used to manage one or more aspects of wireless communication for the apparatus 1115. In some examples, the wireless communication management component 1120 may include a synchronization signal monitoring component 1135 and/or a timing information processing component 1140.

In some examples, the synchronization signal monitoring component 1135 be used to monitor an unlicensed radio frequency spectrum band, to receive an asynchronous transmission of a synchronization signal from a base station (e.g., a base station of an eNB). In some examples, the synchronization signal may include a PSS, an SSS, a CRS (e.g., an eCRS), and/or a CSI-RS.

In some examples, the timing information processing component 1140 may be used to receive a synchronization signal with timing information from a base station. In some examples, the timing information may include an indication of a current frame of the base station and a current subframe of the base station (e.g., for subframe synchronous transmissions of the synchronization signal). In some examples, the timing information may include an indication of a current frame of the base station, a current subframe of the base station, and/or a current symbol (e.g., for subframe asynchronous and OFDM symbol synchronous transmissions of the synchronization signal).

In some examples, the wireless communication management component 1120 may be used to performing RRM measurements on a synchronization signal. In some examples, the wireless communication management component 1120 may be used to synchronize the apparatus 1115 with a base station based at least in part on received timing information and/or RRM measurements performed on the synchronization signal. In some examples, the wireless communication management component 1120 may be used to receive system information for a base station with a synchronization signal. The system information may be received in a SIB and/or a MIB.

Figure 12:
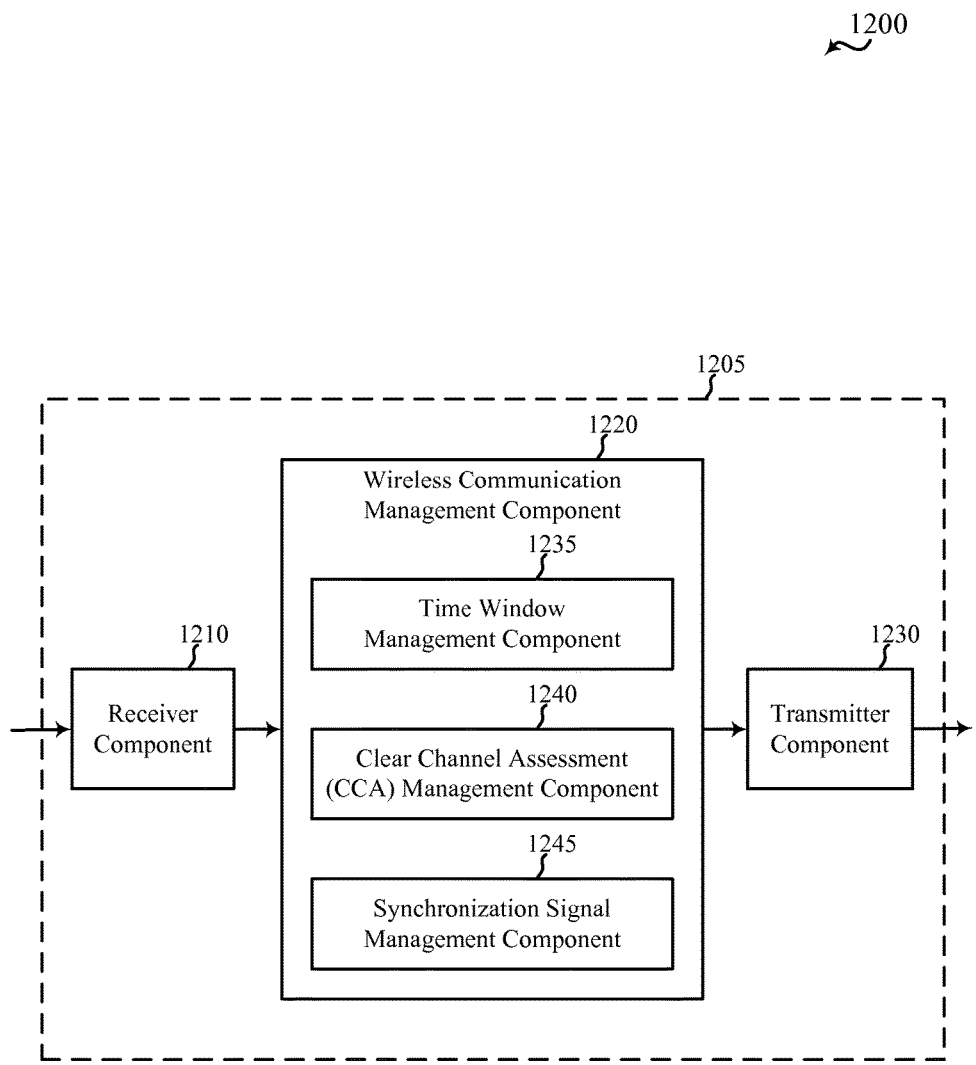
FIG. 12 shows a block diagram of an apparatus for use in wireless communication, in accordance with various aspects of the present disclosure.

FIG. 12 shows a block diagram 1200 of an apparatus 1205 for use in wireless communication, in accordance with various aspects of the present disclosure. The apparatus 1205 may be an example of aspects of one or more of the base stations 105, 205, and/or 205-a described with reference to FIGS. 1 and/or 2. The apparatus 1205 may also be or include a processor. The apparatus 1205 may include a receiver component 1210, a wireless communication management component 1220, and/or a transmitter component 1230. Each of these components may be in communication with each other.

The components of the apparatus 1205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. In some examples, the components as shown in FIG. 12 each may be executed in a dedicated hardware (e.g., a circuit or circuitry) for performing the functions described herein.

In some examples, the receiver component 1210 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver component 1210 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter component 1230 may include at least one RF transmitter, such as at least one RF transmitter operable to transmit over the licensed radio frequency spectrum band and/or the unlicensed radio frequency spectrum band. The transmitter component 1230 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management component 1220 may be used to manage one or more aspects of wireless communication for the apparatus 1205. In some examples, the wireless communication management component 1220 may include a time window management component 1235, a CCA management component 1240, and/or a synchronization signal management component 1245.

In some examples, the time window management component 1235 may be used to transmit an indication of a time window associated with an asynchronous transmission of a synchronization signal. The indication of the time window may be transmitted over an unlicensed radio frequency spectrum band. In some examples, the indication of the time window may be transmitted in a SIB and/or a MIB. In some examples, the indication of the time window may be transmitted in an RRC message. In some examples, the synchronization signal may include a PSS, an SSS, a CRS (e.g., an eCRS), and/or a CSI-RS.

In some examples, the CCA management component 1240 may be used to perform a number of CCAs on an unlicensed radio frequency spectrum band, during a time window managed by the time window management component 1235. In some examples, the number of CCAs may include a single CCA. In some examples, the number of CCAs may include a plurality of CCAs.

In some examples, the synchronization signal management component 1245 may be used to transmit a synchronization signal over an unlicensed radio frequency spectrum band, at a transmission time during a time window managed by the time window management component 1235. The transmission time may be based at least in part on a result of at least one of the CCAs performed by the CCA management component 1240.

Figure 13:
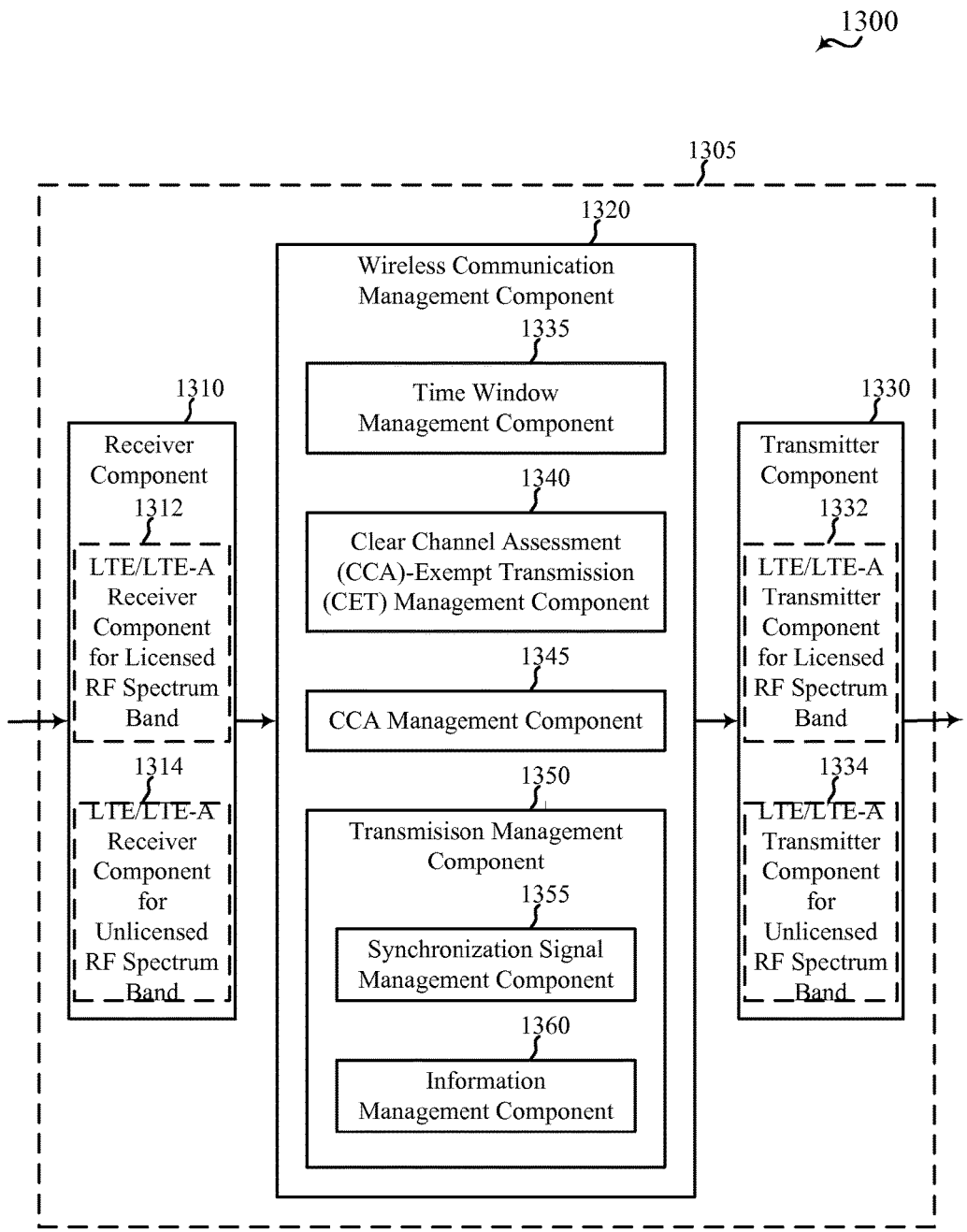
FIG. 13 shows a block diagram of an apparatus for use in wireless communication, in accordance with various aspects of the present disclosure.

FIG. 13 shows a block diagram 1300 of an apparatus 1305 for use in wireless communication, in accordance with various aspects of the present disclosure. The apparatus 1305 may be an example of aspects of one or more of the base stations 105, 205, and/or 205-*a* described with reference to FIGS. 1 and/or 2, and/or an example of aspects of the apparatus 1205 described with reference to FIG. 12. The apparatus 1305 may also be or include a processor. The apparatus 1305 may include a receiver component 1310, a wireless communication management component 1320, and/or a transmitter component 1330. Each of these components may be in communication with each other.

The components of the apparatus 1305 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. In some examples, the components as shown in FIG. 13 each may be executed in a dedicated hardware (e.g., a circuit or circuitry) for performing the functions described herein.

In some examples, the receiver component 1310 may include at least one radio RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver component 1310 may in some cases include separate receivers for the licensed radio frequency spectrum band and the unlicensed radio frequency spectrum band. The separate receivers may, in some examples, take the form of an LTE/LTE-A receiver component for communicating over the licensed radio frequency spectrum band (e.g., LTE/LTE-A receiver component for licensed RF spectrum band 1312), and an LTE/LTE-A receiver component for communicating over the unlicensed radio frequency spectrum band (e.g., LTE/LTE-A receiver component for unlicensed RF spectrum band 1314). The receiver component 1310, including the LTE/LTE-A receiver component for licensed RF spectrum band 1312 and/or the LTE/LTE-A receiver component for unlicensed RF spectrum band 1314, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter component 1330 may include at least one RF transmitter, such as at least one RF transmitter operable to transmit over the licensed radio frequency spectrum band and/or the unlicensed radio frequency spectrum band. The transmitter component 1330 may in some cases include separate transmitters for the licensed radio frequency spectrum band and the unlicensed radio frequency spectrum band. The separate transmitters may, in some examples, take the form of an LTE/LTE-A transmitter component for communicating over the licensed radio frequency spectrum band (e.g., LTE/LTE-A transmitter component for licensed RF spectrum band 1332), and an LTE/LTE-A transmitter component for communicating over the unlicensed radio frequency spectrum band (e.g., LTE/LTE-A transmitter component for unlicensed RF spectrum band 1334). The transmitter component 1330, including the LTE/LTE-A transmitter component for licensed RF spectrum band 1332 and/or the LTE/LTE-A transmitter component for unlicensed RF spectrum band 1334, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management component 1320 may be used to manage one or more aspects of wireless communication for the apparatus 1305. In some examples, the wireless communication management component 1320 may include a time window management component 1335, a CET management component 1340, a CCA management component 1345, and/or a transmission management component 1350.

In some examples, the time window management component 1335 may be used to transmit an indication of a time window associated with an asynchronous transmission of a synchronization signal. The indication of the time window may be transmitted over an unlicensed radio frequency spectrum band. In some examples, the indication of the time window may be transmitted in a SIB and/or a MIB. In some examples, the indication of the time window may be transmitted in an RRC message. In some examples, the synchronization signal may include a PSS, an SSS, a CRS (e.g., an eCRS), and/or a CSI-RS.

In some examples, the CET management component 1340 may be used to manage a transmission of CETs by the apparatus 1305 and/or a coordination of CETs and timing windows of the apparatus 1305. In some examples, a time window may replace at least one CET of the apparatus 1305.

In some examples, the CCA management component 1345 may be used to perform a number of CCAs on an unlicensed radio frequency spectrum band, during a time window managed by the time window management component 1335. In some examples, the number of CCAs may include a single CCA. In some examples, the number of CCAs may include a plurality of CCAs.

In some examples, the transmission management component 1350 may be used to manage various transmissions of the apparatus 1305. In some examples, the transmission management component 1350 may include a synchronization signal management component 1355 and/or an information management component 1360. In some examples, the synchronization signal management component 1355 may be used to transmit a synchronization signal over an unlicensed radio frequency spectrum band, at a transmission time during a time window managed by the time window management component 1335. The transmission time may be based at least in part on a result of at least one of the CCAs performed by the CCA management component 1345. In some examples, the CCA management component 1345 may identify a first successful one of the CCAs performed by the CCA management component 1345 during a time window, and the transmission time may follow the first successful one of the CCAs. In some examples, the CCA management component 1345 may determine that none of the CCAs performed by the CCA management component 1345 during a time window was successful, and the transmission time may follow the performance of a last unsuccessful one of the number of CCAs during the time window, or the transmission time may occur at an end of the time window.

In some examples, the synchronization signal management component 1355 may be used to also or alternatively transmit the synchronization signal over the unlicensed radio frequency spectrum band during a CET. In some examples, the synchronization signal management component 1355 may be used to also or alternatively transmit the synchronization signal over the unlicensed radio frequency spectrum band opportunistically during a periodic fixed subframe location. In some examples, the time window may be associated with a different set of subcarrier frequencies of the unlicensed radio frequency spectrum band than the transmission subject to CCA. In some examples, the time window may overlap in time with a periodic fixed subframe location of the apparatus 1305.

In some examples, the information management component 1360 may be used to transmit DCI for a subframe in which a synchronization signal will be transmitted. The DCI may signal at least one resource that will be used to transmit the synchronization signal in the subframe. In some examples, the information management component 1360 may be used to transmit timing information during a time window managed by the time window management component 1335. In some examples, the timing information may include an indication of a current frame of the apparatus 1305, a current subframe of the apparatus 1305, and/or a current symbol. In some examples, the information management component 1360 may be used to transmit system information for the base station during a time window managed by the time window management component 1335. In some examples, the system information may be transmitted in a SIB and/or a MIB.

Figure 14:
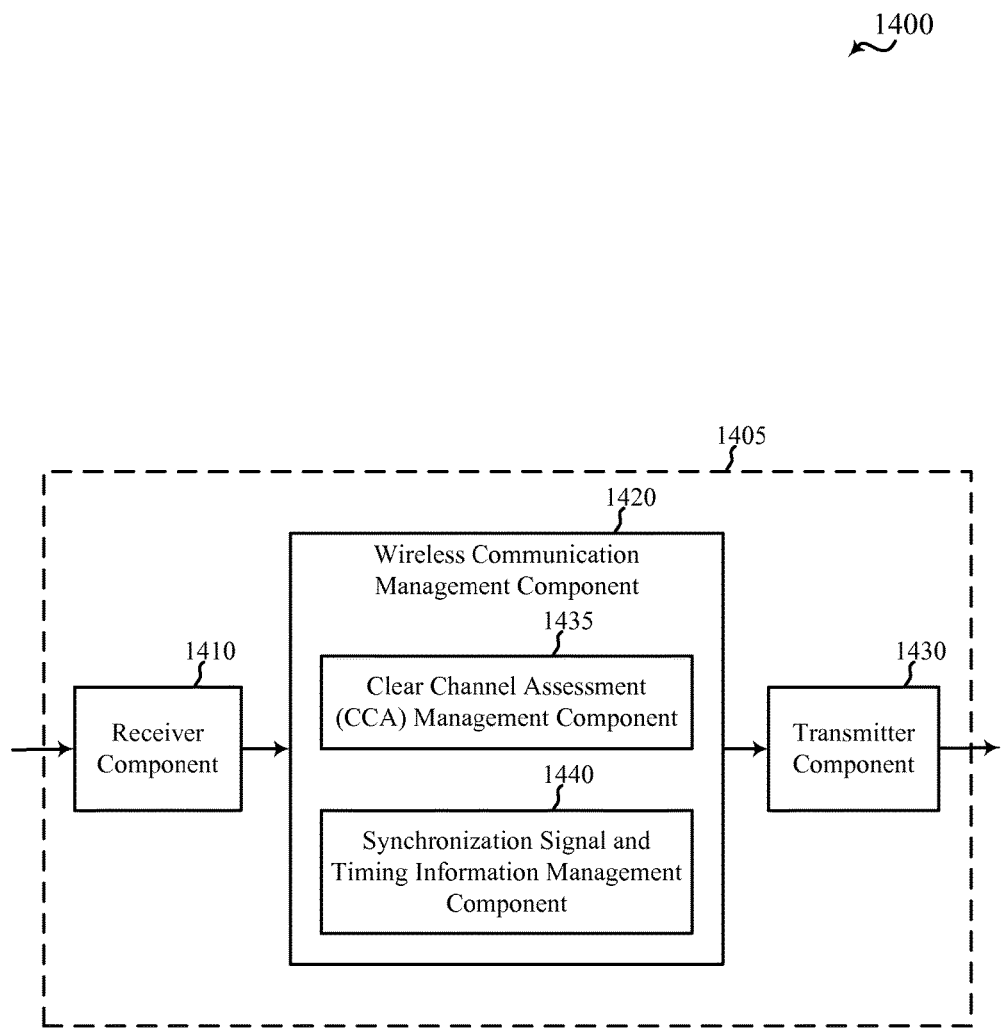
FIG. 14 shows a block diagram of an apparatus for use in wireless communication, in accordance with various aspects of the present disclosure.

FIG. 14 shows a block diagram 1400 of an apparatus 1405 for use in wireless communication, in accordance with various aspects of the present disclosure. The apparatus 1405 may be an example of aspects of one or more of the base stations 105, 205, and/or 205-*a* described with reference to FIGS. 1 and/or 2. The apparatus 1405 may also be or include a processor. The apparatus 1405 may include a receiver component 1410, a wireless communication management component 1420, and/or a transmitter component 1430. Each of these components may be in communication with each other.

The components of the apparatus 1405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. In some examples, the components as shown in FIG. 14 each may be executed in a dedicated hardware (e.g., a circuit or circuitry) for performing the functions described herein.

In some examples, the receiver component 1410 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver component 1410 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter component 1430 may include at least one RF transmitter, such as at least one RF transmitter operable to transmit over the licensed radio frequency spectrum band and/or the unlicensed radio frequency spectrum band. The transmitter component 1430 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management component 1420 may be used to manage one or more aspects of wireless communication for the apparatus 1405. In some examples, the wireless communication management component 1420 may include a CCA management component 1435, and/or a synchronization signal and timing information management component 1440.

In some examples, the CCA management component 1435 may be used to perform a number of CCAs on an unlicensed radio frequency spectrum band. In some examples, the number of CCA may include a plurality of CCAs. Each of the number of CCAs may be successful or unsuccessful.

In some examples, the synchronization signal and timing information management component 1440 may be used to asynchronously transmit a synchronization signal and timing information over an unlicensed radio frequency spectrum band, at a transmission time based at least in part on a result of at least one of the CCAs performed by the CCA management component 1435. In some examples, the synchronization signal may include a PSS, an SSS, a CRS (e.g., an eCRS), and/or a CSI-RS. In some examples, the timing information may include an indication of a current frame and a current subframe of the apparatus 1405 (e.g., for subframe synchronous transmissions of the synchronization signal). In some examples, the timing information may include an indication of a current frame of the apparatus 1405, a current subframe of the apparatus 1405, and/or a current symbol (e.g., for subframe asynchronous and OFDM symbol synchronous transmissions of the synchronization signal). In some examples, the CCA management component 1435 may identify a first successful one of the CCAs performed by the CCA management component 1435, and the transmission time may follow the first successful one of the CCAs. In some examples, the CCA management component 1435 may determine that none of the CCAs performed by the CCA management component 1435 was successful, and the transmission time may follow the performance of a last unsuccessful one of the number of CCAs.

In some examples, the wireless communication management component 1420 may be used to transmit system information for the apparatus 1405 with a synchronization signal. The system information may be transmitted in a SIB and/or a MIB.

Figure 15:
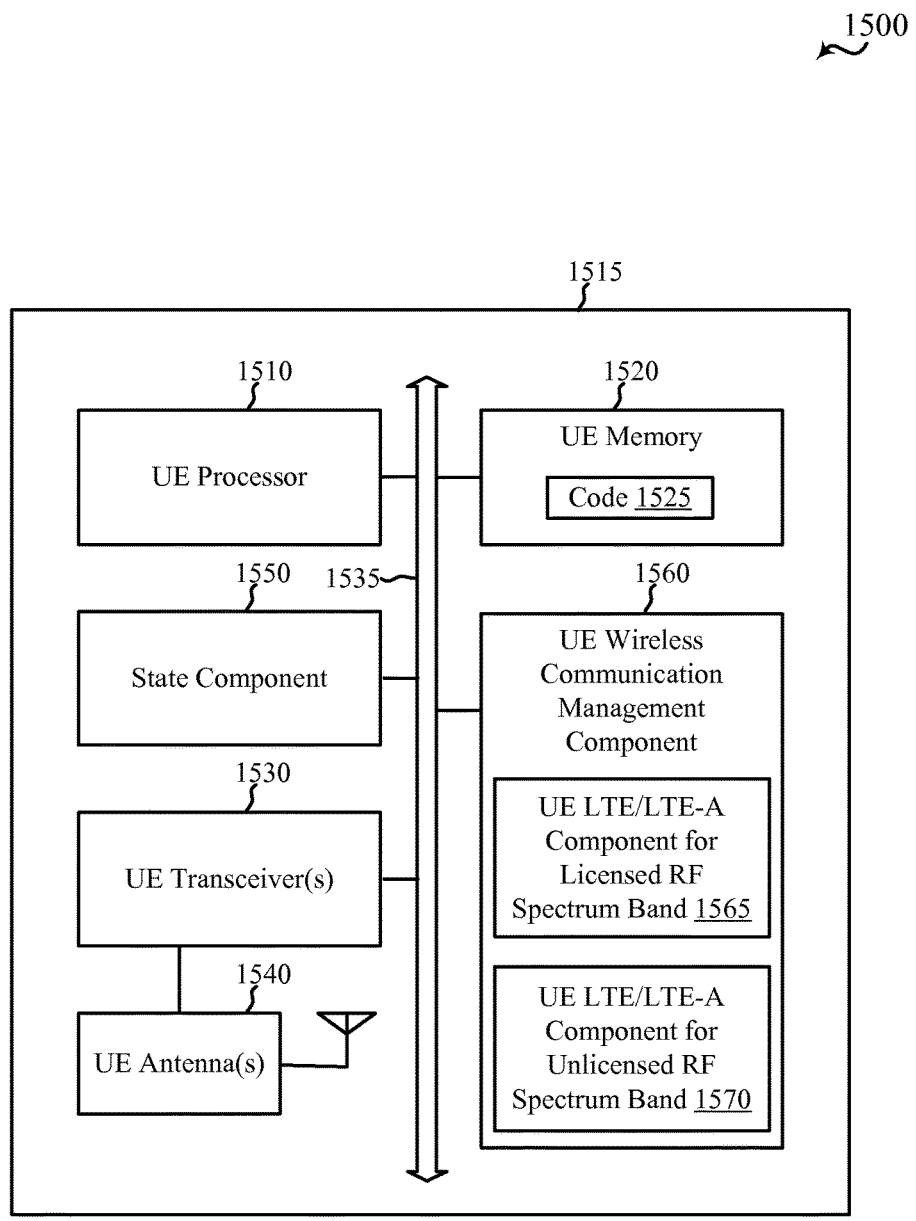
FIG. 15 shows a block diagram of a user equipment (UE) for use in wireless communication, in accordance with various aspects of the present disclosure.

FIG. 15 shows a block diagram 1500 of a UE 1515 for use in wireless communication, in accordance with various aspects of the present disclosure. The UE 1515 may have various configurations and may be included or be part of a personal computer (e.g., a laptop computer, a netbook computer, a tablet computer, etc.), a cellular telephone (e.g., a smart phone), a PDA, a digital video recorder (DVR), an internet appliance, a gaming console, an e-reader, etc. The UE 1515 may, in some examples, have an internal power supply (not shown), such as a small battery, to facilitate mobile operation. In some examples, the UE 1515 may be an example of aspects of one or more of the UE 115, 215, 215-a, 215-b, and/or 215-c described with reference to FIGS. 1 and/or 2, and/or aspects of one or more of the apparatuses 915, 1015, and/or 1115 described with reference to FIGS. 9, 10, and/or 11. The UE 1515 may be configured to implement at least some of the UE and/or apparatus features and functions described with reference to FIGS. 1, 2, 3, 4, 5, 6, 7, 8, 9, 10, and/or 11.

The UE 1515 may include a UE processor 1510, a UE memory 1520, at least one UE transceiver (represented by UE transceiver(s) 1530), at least one UE antenna (represented by UE antenna(s) 1540), and/or a UE wireless communication management component 1560. Each of these components may be in communication with each other, directly or indirectly, over one or more buses 1535.

The UE memory 1520 may include random access memory (RAM) and/or read-only memory (ROM). The UE memory 1520 may store computer-readable, computer-executable code 1525 containing instructions that are configured to, when executed, cause the UE processor 1510 to perform various functions described herein related to wireless communication, including the monitoring of an unlicensed radio frequency spectrum band to receive synchronization signals from a base station (e.g., from one of the base stations 105, 205, and/or 205-a described with reference to FIGS. 1 and/or 2). Alternatively, the code 1525 may not be directly executable by the UE processor 1510 but be configured to cause the UE 1515 (e.g., when compiled and executed) to perform various of the functions described herein.

The UE processor 1510 may include an intelligent hardware device, e.g., a central processing unit (CPU), a microcontroller, an ASIC, etc. The UE processor 1510 may process information received through the UE transceiver(s) 1530 and/or information to be sent to the UE transceiver(s) 1530 for transmission through the UE antenna(s) 1540. The UE processor 1510 may handle, alone or in connection with the UE wireless communication management component 1560, various aspects of communicating over (or managing communications over) a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use).

The UE transceiver(s) 1530 may include a modem configured to modulate packets and provide the modulated packets to the UE antenna(s) 1540 for transmission, and to demodulate packets received from the UE antenna(s) 1540. The UE transceiver(s) 1530 may, in some examples, be implemented as one or more UE transmitters and one or more separate UE receivers. The UE transceiver(s) 1530 may support communications in the licensed radio frequency spectrum band and/or the unlicensed radio frequency spectrum band. The UE transceiver(s) 1530 may be configured to communicate bi-directionally, via the UE antenna(s) 1540, with one or more base stations. While the UE 1515 may include a single UE antenna, there may be examples in which the UE 1515 may include multiple UE antennas 1540.

The UE state component 1550 may be used, for example, to manage transitions of the UE 1515 between an RRC idle state and an RRC connected state, and may be in communication with other components of the UE 1515, directly or indirectly, over the one or more buses 1535. The UE state component 1550, or portions of it, may include a processor, and/or some or all of the functions of the UE state component 1550 may be performed by the UE processor 1510 and/or in connection with the UE processor 1510.

The UE wireless communication management component 1560 may be configured to perform and/or control some or all of the UE and/or apparatus features and functions described with reference to FIGS. 1, 2, 3, 4, 5, 6, 7, 8, 9, 10, and/or 11 related to wireless communication over a licensed radio frequency spectrum band and/or an unlicensed radio frequency spectrum band. For example, the UE wireless communication management component 1560 may be configured to support a supplemental downlink mode, a carrier aggregation mode, and/or a standalone mode using the licensed radio frequency spectrum band and/or the unlicensed radio frequency spectrum band. The UE wireless communication management component 1560 may include a UE LTE/LTE-A component for licensed RF spectrum band 1565 configured to handle LTE/LTE-A communications in the licensed radio frequency spectrum band, and a UE LTE/LTE-A component for unlicensed RF spectrum band 1570 configured to handle LTE/LTE-A communications in the unlicensed radio frequency spectrum band. The UE wireless communication management component 1560, or portions of it, may include a processor, and/or some or all of the functions of the UE wireless communication management component 1560 may be performed by the UE processor 1510 and/or in connection with the UE processor 1510. In some examples, the UE wireless communication management component 1560 may be an example of the wireless communication management component 920, 1020, and/or 1120 described with reference to FIGS. 9, 10, and/or 11.

Figure 16:
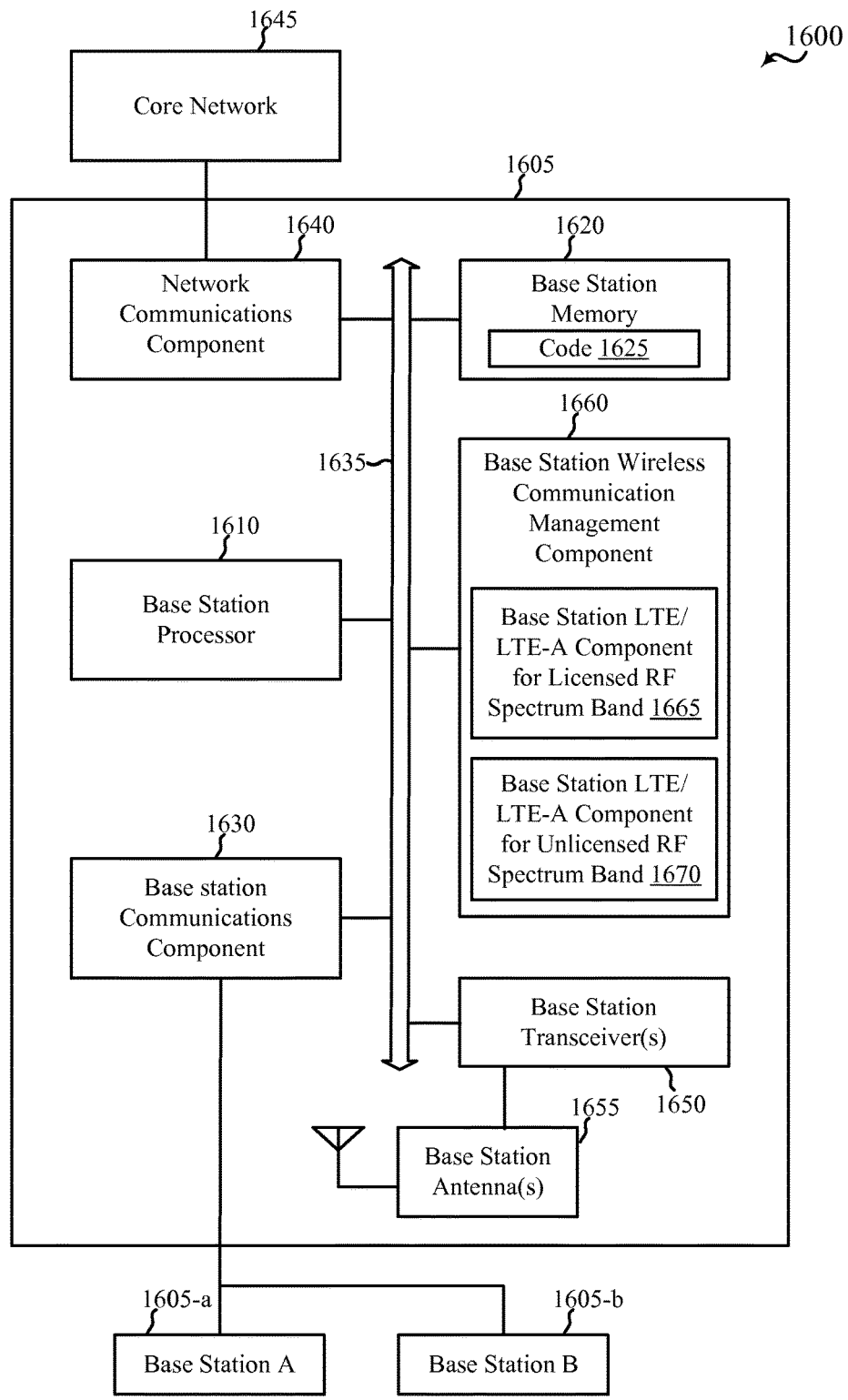
FIG. 16 shows a block diagram of a base station (e.g., a base station forming part or all of an eNodeB (eNB)) for use in wireless communication, in accordance with various aspects of the present disclosure.

FIG. 16 shows a block diagram 1600 of a base station 1605 (e.g., a base station forming part or all of an eNB) for use in wireless communication, in accordance with various aspects of the present disclosure. In some examples, the base station 1605 may be an example of aspects of one or more of the base stations 105, 205, and/or 205-*a* described with reference to FIGS. 1 and/or 2, and/or aspects of one or more of the apparatuses 1205, 1305, and/or 1405 described with reference to FIGS. 12, 13, and/or 14. The base station 1605 may be configured to implement or facilitate at least some of the base station, transmitting apparatus, and/or receiving apparatus features and functions described with reference to FIGS. 1, 2, 3, 4, 5, 6, 7, 8, 12, 13, and/or 14.

The base station 1605 may include a base station processor 1610, a base station memory 1620, at least one base station transceiver (represented by base station transceiver(s) 1650), at least one base station antenna (represented by base station antenna(s) 1655), and/or a base station wireless communication management component 1660. The base station 1605 may also include one or more of a base station communications component 1630 and/or a network communications component 1640. Each of these components may be in communication with each other, directly or indirectly, over one or more buses 1635.

The base station memory 1620 may include RAM and/or ROM. The base station memory 1620 may store computer-readable, computer-executable code 1625 containing instructions that are configured to, when executed, cause the base station processor 1610 to perform various functions described herein related to wireless communication, including the transmission of a timing window, a synchronization signal, and/or timing information. Alternatively, the code 1625 may not be directly executable by the base station processor 1610 but be configured to cause the base station 1605 (e.g., when compiled and executed) to perform various of the functions described herein.

The base station processor 1610 may include an intelligent hardware device, e.g., a CPU, a microcontroller, an ASIC, etc. The base station processor 1610 may process information received through the base station transceiver(s) 1650, the base station communications component 1630, and/or the network communications component 1640. The base station processor 1610 may also process information to be sent to the transceiver(s) 1650 for transmission through the antenna(s) 1655, to the base station communications component 1630, for transmission to one or more other base stations 1605-*a* and 1605-*b*, and/or to the network communications component 1640 for transmission to a core network 1645, which may be an example of one or more aspects of the core network 130 described with reference to FIG. 1. The base station processor 1610 may handle, alone or in connection with the base station wireless communication management component 1660, various aspects of communicating over (or managing communications over) a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use).

The base station transceiver(s) 1650 may include a modem configured to modulate packets and provide the modulated packets to the base station antenna(s) 1655 for transmission, and to demodulate packets received from the base station antenna(s) 1655. The base station transceiver(s) 1650 may, in some examples, be implemented as one or more base station transmitters and one or more separate base station receivers. The base station transceiver(s) 1650 may support communications in the licensed radio frequency spectrum band and/or the unlicensed radio frequency spectrum band. The base station transceiver(s) 1650 may be configured to communicate bi-directionally, via the antenna(s) 1655, with one or more UEs, such as one or more of the UEs 115, 215-*a*, 215-*b*, 215-*c*, and/or 1515 described with reference to FIGS. 1, 2, and/or 15. The base station 1605 may, for example, include multiple base station antennas 1655 (e.g., an antenna array). The base station 1605 may communicate with the core network 1645 through the network communications component 1640. The base station 1605 may also communicate with other base stations, such as the base stations 1605-*a* and 1605-*b*, using the base station communications component 1630.

The base station wireless communication management component 1660 may be configured to perform and/or control some or all of the base station and/or apparatus features and functions described with reference to FIGS. 1, 2, 3, 4, 5, 6, 7, 8, 12, 13, and/or 14 related to wireless communication over a licensed radio frequency spectrum band and/or an unlicensed radio frequency spectrum band. For example, the base station wireless communication management component 1660 may be configured to support a supplemental downlink mode, a carrier aggregation mode, and/or a standalone mode using the licensed radio frequency spectrum band and/or the unlicensed radio frequency spectrum band. The base station wireless communication management component 1660 may include a base station LTE/LTE-A component for licensed RF spectrum band 1665 configured to handle LTE/LTE-A communications in the licensed radio frequency spectrum band, and a base station LTE/LTE-A component for unlicensed RF spectrum band 1670 configured to handle LTE/LTE-A communications in the unlicensed radio frequency spectrum band. The base station wireless communication management component 1660, or portions of it, may include a processor, and/or some or all of the functions of the base station wireless communication management component 1660 may be performed by the base station processor 1610 and/or in connection with the base station processor 1610. In some examples, the base station wireless communication management component 1660 may be an example of the wireless communication management component 1220, 1320, and/or 1420 described with reference to FIGS. 12, 13, and/or 14.

Figure 17:
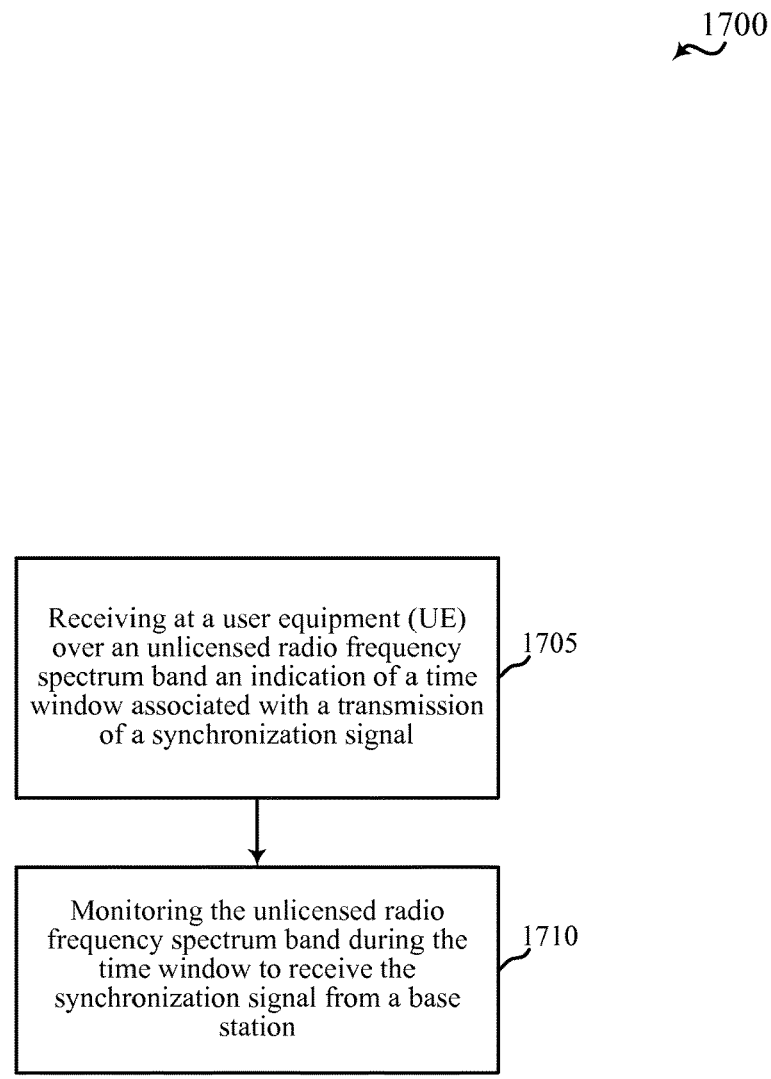
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the UEs 115, 215, 215-*a*, 215-*b*, 215-*c*, and/or 1515 described with reference to FIGS. 1, 2, and/or 15, and/or aspects of one or more of the apparatuses 915 and/or 1015 described with reference to FIGS. 9 and/or 10. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1705, the method 1700 may include receiving at a UE over an unlicensed radio frequency spectrum band an indication of a time window associated with a transmission of a synchronization signal. In some examples, the unlicensed radio frequency spectrum band may include a radio frequency spectrum band for which apparatuses may contend for access because the radio frequency spectrum band is available for unlicensed use, such as Wi-Fi use. In some examples, the indication of the time window may be received in a SIB and/or a MIB. In some examples, the indication of the time window may be received in an RRC message. In some examples, the synchronization signal may include a PSS, an SSS, a CRS (e.g., an eCRS), and/or a CSI-RS. The operation(s) at block 1705 may be performed using the wireless communication management component 920, 1020, and/or 1560 described with reference to FIGS. 9, 10, and/or 15, and/or the time window management component 935 and/or 1035 described with reference to FIGS. 9 and/or 10.

At block 1710, the method 1700 may include monitoring the unlicensed radio frequency spectrum band during the time window to receive the synchronization signal from a base station (e.g., a base station of an eNB). The operation(s) at block 1710 may be performed using the wireless communication management component 920, 1020, and/or 1560 described with reference to FIGS. 9, 10, and/or 15, and/or the synchronization signal monitoring component 940 and/or 1050 described with reference to FIGS. 9 and/or 10.

Thus, the method 1700 may provide for wireless communication. It should be noted that the method 1700 is just one implementation and that the operations of the method 1700 may be rearranged or otherwise modified such that other implementations are possible.

Figure 18:
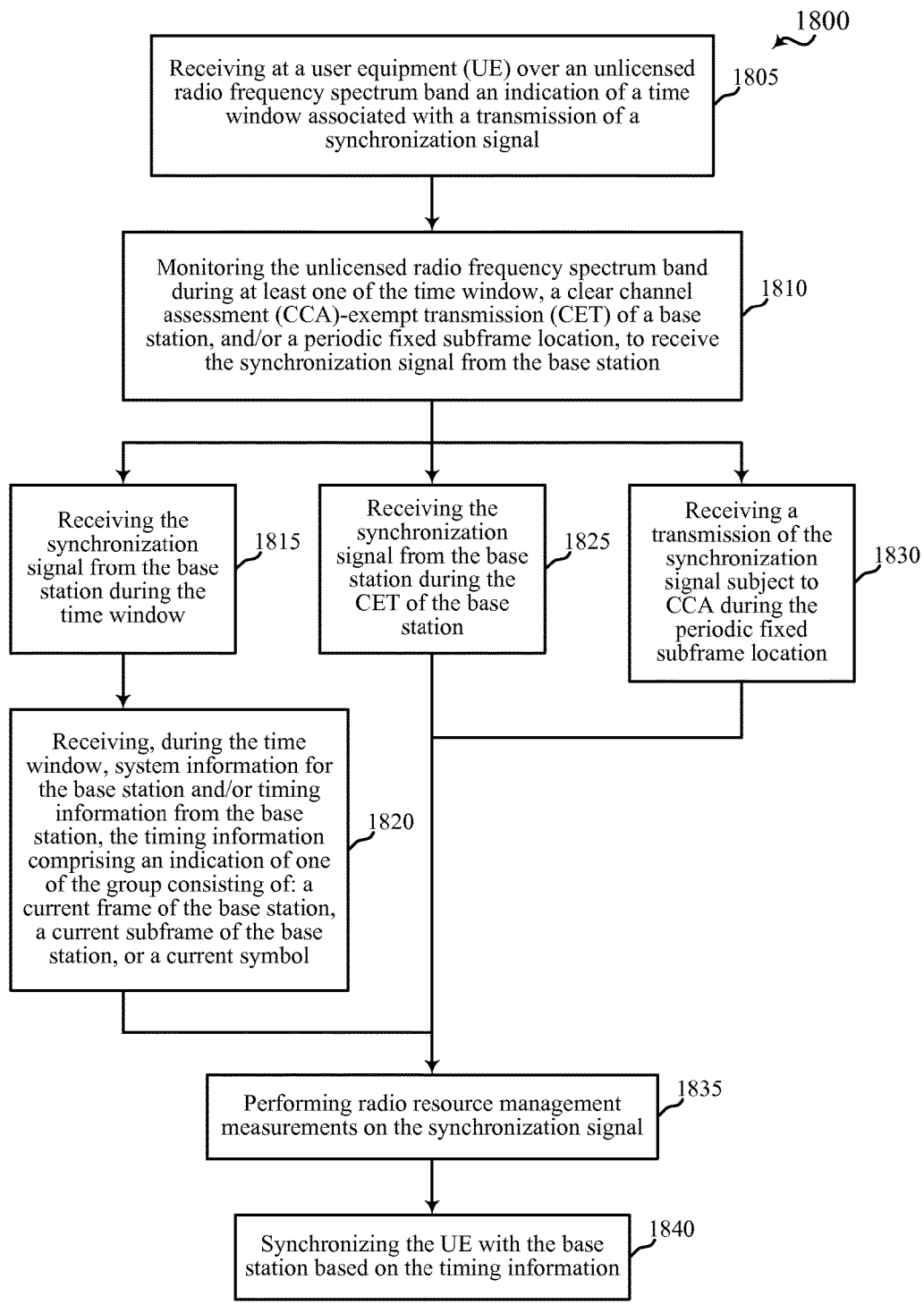
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the UEs 115, 215, **215-*a*, 215-*b*, 215-*c*, and/or 1515 described with reference to FIGS. 1, 2, and/or 15, and/or aspects of one or more of the apparatuses 915 and/or 1015 described with reference to FIGS. 9 and/or 10**. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1805, the method 1800 may include receiving at a UE over an unlicensed radio frequency spectrum band an indication of a time window associated with a transmission of a synchronization signal. In some examples, the unlicensed radio frequency spectrum band may include a radio frequency spectrum band for which apparatuses may contend for access because the radio frequency spectrum band is available for unlicensed use, such as Wi-Fi use. In some examples, the indication of the time window may be received in a SIB and/or a MIB. In some examples, the indication of the time window may be received in an RRC message. In some examples, the synchronization signal may include a PSS, an SSS, a CRS (e.g., an eCRS), and/or a CSI-RS. The operation(s) at block 1805 may be performed using the wireless communication management component 920, 1020, and/or 1560 described with reference to FIGS. 9, 10, and/or 15, and/or the time window management component 935 and/or 1035 described with reference to FIGS. 9 and/or 10.

At block 1810, the method 1800 may include monitoring the unlicensed radio frequency spectrum band to receive the synchronization signal from a base station (e.g., a base station of an eNB). In some examples, the monitoring may include waking up a receiver of the UE from a sleep state prior to the time window. The operation(s) at block 1810 may be performed using the wireless communication management component 920, 1020, and/or 1560 described with reference to FIGS. 9, 10, and/or 15, and/or the synchronization signal monitoring component 940 and/or 1050 described with reference to FIGS. 9 and/or 10.

In some examples, the monitoring performed at block 1810 may include monitoring the unlicensed radio frequency spectrum band during the time window, monitoring the unlicensed radio frequency spectrum band during a CET of the base station, and/or monitoring the unlicensed radio frequency spectrum band during a periodic fixed subframe location. In some examples, the time window may replace at least one CET of the base station.

At block 1815, the method 1800 may include receiving the synchronization signal from the base station during the time window. The operation(s) at block 1815 may be performed using the wireless communication management component 920, 1020, and/or 1560 described with reference to FIGS. 9, 10, and/or 15, the synchronization signal monitoring component 940 and/or 1050 described with reference to FIGS. 9 and/or 10, and/or the synchronization signal processing component 1060 described with reference to FIG. 10.

At block 1820, the method 1800 may include receiving, during the time window, timing information from the base station. In some examples, the timing information may include an indication of a current frame of the base station, a current subframe of the base station, and/or a current symbol. Also or alternatively at block 1820, the method 1800 may include receiving system information for the base station during the time window. The system information may be received in a SIB and/or a MIB. The operation(s) at block 1820 may be performed using the wireless communication management component 920, 1020, and/or 1560 described with reference to FIGS. 9, 10, and/or 15, and/or the timing information processing component 1070 described with reference to FIG. 10.

At block 1825, the method 1800 may include receiving the synchronization signal from the base station during the CET of the base station. The operation(s) at block 1825 may be performed using the wireless communication management component 920, 1020, and/or 1560 described with reference to FIGS. 9, 10, and/or 15, the synchronization signal monitoring component 940 and/or 1050 described with reference to FIGS. 9 and/or 10, and/or the synchronization signal processing component 1060 described with reference to FIG. 10.

At block 1830, the method 1800 may include receiving a transmission of the synchronization signal subject to CCA during the periodic fixed subframe location. The operation(s) at block 1830 may be performed using the wireless communication management component 920, 1020, and/or 1560 described with reference to FIGS. 9, 10, and/or 15, the synchronization signal monitoring component 940 and/or 1050 described with reference to FIGS. 9 and/or 10, and/or synchronization signal processing component 1060 described with reference to FIG. 10.

In some examples of the method 1800, the time window for which the indication is received at block 1805 may be associated with a different set of subcarrier frequencies of the unlicensed radio frequency spectrum band than the transmission subject to CCA received at block 1830. In the same or alternative examples of the method 1800, the time window may overlap in time with the periodic fixed subframe location monitored at block 1810.

At block 1835, the method 1800 may include performing RRM measurements on the synchronization signal received at block 1815. The operation(s) at block 1835 may be performed using the wireless communication management component 920, 1020, and/or 1560 described with reference to FIGS. 9, 10, and/or 15, and/or the synchronization signal processing component 1060 and/or measurement component 1065 described with reference to FIG. 10.

At block 1840, the method 1800 may include synchronizing the UE with the base station based at least in part on the timing information received at block 1820. The synchronizing may also be based at least in part on RRM measurements performed at block 1835. The operation(s) at block 1840 may be performed using the wireless communication management component 920, 1020, and/or 1560 described with reference to FIGS. 9, 10, and/or 15, and/or the synchronization component 1075 described with reference to FIG. 10.

Thus, the method 1800 may provide for wireless communication. It should be noted that the method 1800 is just one implementation and that the operations of the method 1800 may be rearranged or otherwise modified such that other implementations are possible.

Figure 19:
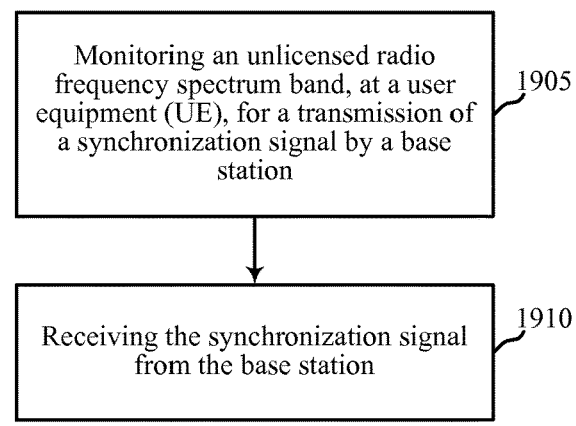
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the UEs 115, 215, 215-a, 215-b, 215-c, and/or 1515 described with reference to FIGS. 1, 2, and/or 15, and/or aspects of one or more of the apparatuses 1015 and/or 1115 described with reference to FIGS. 10 and/or 11. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1905, the method 1900 may include monitoring an unlicensed radio frequency spectrum band, at a UE, to receive a transmission of a synchronization signal from a base station (e.g., a base station of an eNB). In some examples, the unlicensed radio frequency spectrum band may include a radio frequency spectrum band for which apparatuses may contend for access because the radio frequency spectrum band is available for unlicensed use, such as Wi-Fi use. In some examples, the synchronization signal may include a PSS, an SSS, a CRS (e.g., an eCRS), and/or a CSI-RS. The operation(s) at block 1915 may be performed using the wireless communication management component 1020, 1120, and/or 1560 described with reference to FIGS. 10, 11, and/or 15, and/or the synchronization signal monitoring component 1050 and/or 1135 described with reference to FIGS. 10 and/or 11.

At block 1910, the method 1900 may include receiving the synchronization signal from the base station. In some examples, the transmission of the synchronization signal may be received asynchronously. In some examples, the synchronization signal may be received with timing information. The timing information may include an indication of a current frame of the base station and a current subframe of the base station (e.g., for subframe synchronous transmissions of the synchronization signal). In some examples, the timing information may include an indication of a current frame of the base station, a current subframe of the base station, and/or a current symbol (e.g., for subframe asynchronous and OFDM symbol synchronous transmissions of the synchronization signal). The operation(s) at block 1910 may be performed using the wireless communication management component 1020, 1120, and/or 1560 described with reference to FIGS. 10, 11, and/or 15, and/or the timing information processing component 1070 and/or 1140 described with reference to FIGS. 10 and/or 11.

In some examples, the method 1900 may include performing RRM measurements on the synchronization signal received at block 1910.

In some examples, the method 1900 may include synchronizing the UE with the base station based at least in part on the timing information received at block 1910. The synchronizing may also be based at least in part on RRM measurements on the synchronization signal.

In some examples, the method 1900 may include receiving system information for the base station with the synchronization signal. The system information may be received in a SIB and/or a MIB.

Thus, the method 1900 may provide for wireless communication. It should be noted that the method 1900 is just one implementation and that the operations of the method 1900 may be rearranged or otherwise modified such that other implementations are possible.

In some examples, aspects of one or more of the methods 1700, 1800, and/or 1900 described with reference to FIGS. 17, 18, and/or 19 may be combined.

Figure 20:
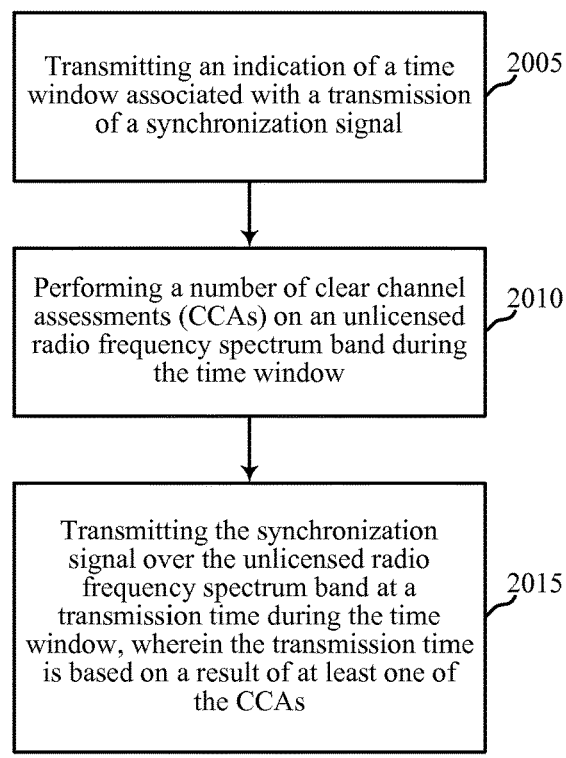
FIG. 20 is a flow chart illustrating an example of a method for wireless communication, in accordance with various aspects of the present disclosure.

FIG. 20 is a flow chart illustrating an example of a method 2000 for wireless communication, in accordance with various aspects of the present disclosure. For clarity, the method 2000 is described below with reference to aspects of one or more of the base stations 105, 205, 205-a, and/or 1605 described with reference to FIGS. 1, 2, and/or 16, and/or aspects of one or more of the apparatuses 1205 and/or 1305 described with reference to FIGS. 12 and/or 13. In some examples, a base station (e.g., a base station of an eNB) or apparatus may execute one or more sets of codes to control the functional elements of the base station or apparatus to perform the functions described below. Additionally or alternatively, the base station or apparatus may perform one or more of the functions described below using special-purpose hardware.

At block 2005, the method 2000 may include transmitting an indication of a time window associated with a transmission of a synchronization signal. The indication of the time window may be transmitted over an unlicensed radio frequency spectrum band. In some examples, the unlicensed radio frequency spectrum band may include a radio frequency spectrum band for which apparatuses may contend for access because the radio frequency spectrum band is available for unlicensed use, such as Wi-Fi use. In some examples, the indication of the time window may be transmitted in a SIB and/or a MIB. In some examples, the indication of the time window may be transmitted in an RRC message. In some examples, the synchronization signal may include a PSS, an SSS, a CRS (e.g., an eCRS), and/or a CSI-RS. The operation(s) at block 2005 may be performed using the wireless communication management component 1220, 1320, and/or 1660 described with reference to FIGS.

12, 13, and/or 16, and/or the time window management component 1235 and/or 1335 described with reference to FIGS. 12 and/or 13.

At block 2010, the method 2000 may include performing a number of CCAs on the unlicensed radio frequency spectrum band during the time window. In some examples, the number of CCAs may include a single CCA. In some examples, the number of CCAs may include a plurality of CCAs. The operation(s) at block 2010 may be performed using the wireless communication management component 1220, 1320, and/or 1660 described with reference to FIGS. 12, 13, and/or 16, and/or the CCA management component 1240 and/or 1345 described with reference to FIGS. 12 and/or 13.

At block 2015, the method 2000 may include transmitting the synchronization signal over the unlicensed radio frequency spectrum band at a transmission time during the time window. The transmission time may be based at least in part on a result of at least one of the CCAs performed at block 2010. The operation(s) at block 2015 may be performed using the wireless communication management component 1220, 1320, and/or 1660 described with reference to FIGS. 12, 13, and/or 16, the synchronization signal management component 1245 and/or 1355 described with reference to FIGS. 12 and/or 13, and/or the transmission management component 1350 described with reference to FIG. 13.

Thus, the method 2000 may provide for wireless communication. It should be noted that the method 2000 is just one implementation and that the operations of the method 2000 may be rearranged or otherwise modified such that other implementations are possible.

Figure 21:
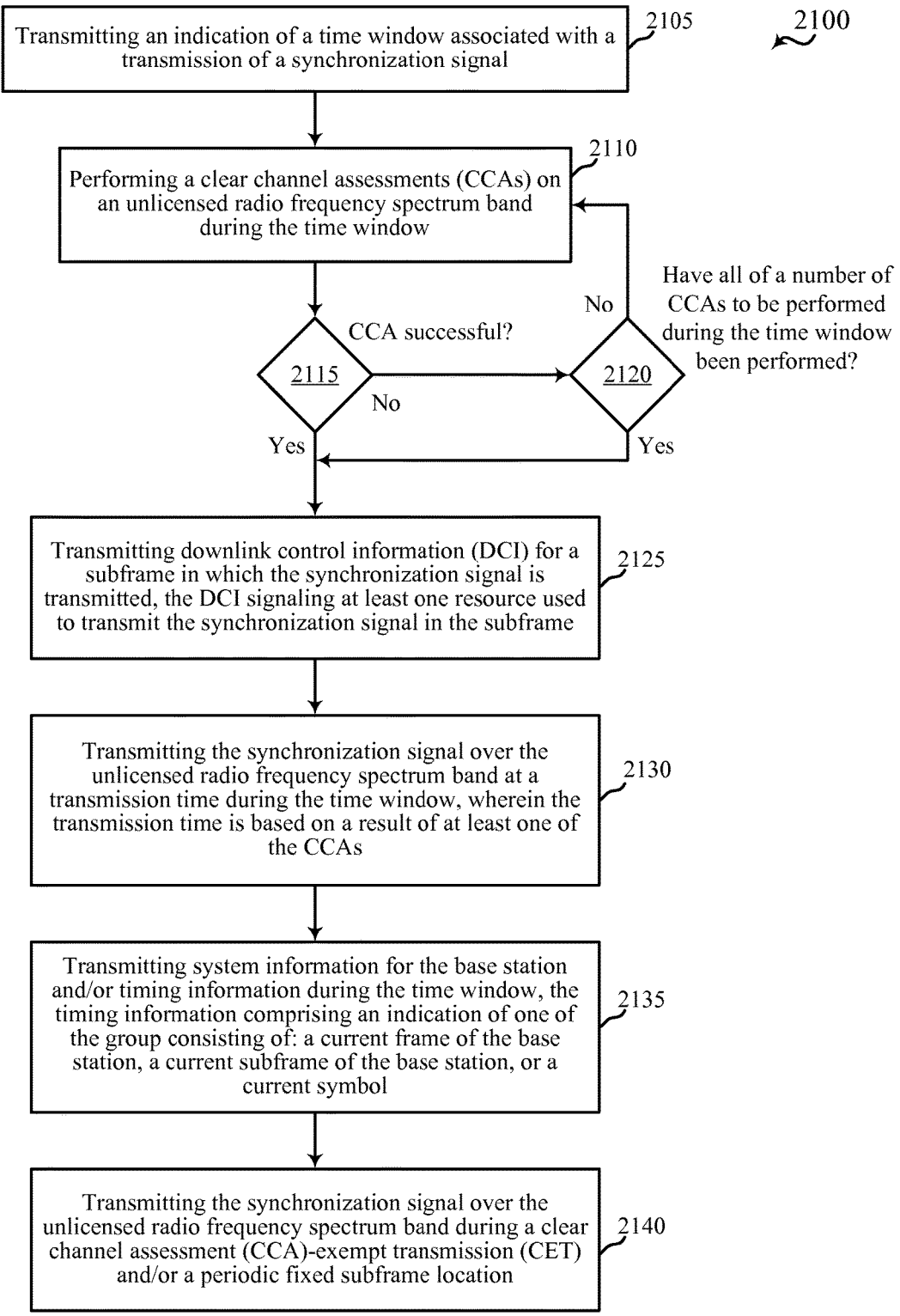
FIG. 21 is a flow chart illustrating an example of a method for wireless communication, in accordance with various aspects of the present disclosure.

FIG. 21 is a flow chart illustrating an example of a method 2100 for wireless communication, in accordance with various aspects of the present disclosure. For clarity, the method 2100 is described below with reference to aspects of one or more of the base stations 105, 205, 205-a, and/or 1605 described with reference to FIGS. 1, 2, and/or 16, and/or aspects of one or more of the apparatuses 1205, 1305, and/or 1405 described with reference to FIGS. 12 and/or 13. In some examples, a base station (e.g., a base station of an eNB) or apparatus may execute one or more sets of codes to control the functional elements of the base station or apparatus to perform the functions described below. Additionally or alternatively, the base station or apparatus may perform one or more of the functions described below using special-purpose hardware.

At block 2105, the method 2100 may include transmitting an indication of a time window associated with a transmission of a synchronization signal. The indication of the time window may be transmitted over an unlicensed radio frequency spectrum band. In some examples, the unlicensed radio frequency spectrum band may include a radio frequency spectrum band for which apparatuses may contend for access because the radio frequency spectrum band is available for unlicensed use, such as Wi-Fi use. In some examples, the indication of the time window may be transmitted in a SIB and/or a MIB. In some examples, the indication of the time window may be transmitted in an RRC message. In some examples, the time window may replace at least one CET of a base station. In some examples, the synchronization signal may include a PSS, an SSS, and/or a CRS (e.g., an eCRS). The operation(s) at block 2105 may be performed using the wireless communication management component 1220, 1320, and/or 1660 described with reference to FIGS. 12, 13, and/or 16, and/or the time window management component 1235 and/or 1335 described with reference to FIGS. 12 and/or 13.

At block 2110, block 2115, and/or block 2120, the method 2100 may include performing a number of CCAs on the unlicensed radio frequency spectrum band during the time window. More specifically, and at block 2110, the method 2100 may include performing a CCA on the unlicensed radio frequency spectrum band during the time window. At block 2115, the method 2100 may include determining whether the CCA was successful. When it is determined that the CCA was successful, the method 2100 may proceed to block 2125. When it is determined that the CCA was not successful, the method 2100 may proceed to block 2120. At block 2120, the method 2100 may include determining whether all of a number of CCAs to be performed during the time window have been performed. In some examples, the number of CCAs may include a single CCA. In some examples, the number of CCAs may include a plurality of CCAs. When it is determined that at least one CCA of the number of CCAs has not yet been performed, the method 2100 may include performing a next CCA of the number of CCAs at block 2110. When it is determined that each of the CCAs in the number of CCAs has already been performed, and/or that none of the number of CCAs performed during the time window were successful, the method 2100 may proceed to block 2125. The operation(s) at block 2110, 2115, and/or 2120 may be performed using the wireless communication management component 1220, 1320, and/or 1660 described with reference to FIGS. 12, 13, and/or 16, and/or the CCA management component 1240 and/or 1345 described with reference to FIGS. 12 and/or 13.

At block 2125, the method 2100 may include transmitting DCI for a subframe in which a synchronization signal will be transmitted. The DCI may signal at least one resource that will be used to transmit the synchronization signal in the subframe. The operation(s) at block 2125 may be performed using the wireless communication management component 1220, 1320, and/or 1660 described with reference to FIGS. 12, 13, and/or 16, and/or the transmission management component 1350 and/or information management component 1360 described with reference to FIG. 13.

At block 2130, the method 2100 may include transmitting the synchronization signal over the unlicensed radio frequency spectrum band at a transmission time during the time window. The transmission time may be based at least in part on a result of at least one of the CCAs performed at block 2110. In some examples, the transmission time may follow a first successful one of the CCAs performed during the time window at block 2110, as identified at block 2115. In some examples, the transmission time may follow a last unsuccessful one of the CCAs performed during the time window at block 2110, as identified at block 2120, and/or the transmission time may occur at an end of the time window. The operation(s) at block 2130 may be performed using the wireless communication management component 1220, 1320, and/or 1660 described with reference to FIGS. 12, 13, and/or 16, the synchronization signal management component 1245 and/or 1355 described with reference to FIGS. 12 and/or 13, and/or the transmission management component 1350 described with reference to FIG. 13.

At block 2135, the method 2100 may include transmitting timing information during the time window. In some examples, the timing information may include an indication of a current frame of the base station, a current subframe of the base station, and/or a current symbol. Also or alternatively at block 2135, the method 2100 may include transmitting system information for the base station during the time window. In some examples, the system information may be transmitted in a SIB and/or a MIB. The operation(s)

at block 2135 may be performed using the wireless communication management component 1220, 1320, and/or 1660 described with reference to FIGS. 12, 13, and/or 16, and/or the transmission management component 1350 and/or information management component 1360 described with reference to FIG. 13.

At block 2140, the method 2100 may include transmitting the synchronization signal over the unlicensed radio frequency spectrum band during a CET. Also or alternatively at block 2140, the method 2100 may include transmitting the synchronization signal over the unlicensed radio frequency spectrum band opportunistically, during a periodic fixed subframe location. In some examples, the time window may be associated with a different set of subcarrier frequencies of the unlicensed radio frequency spectrum band than the transmission subject to CCA. In some examples, the time window may overlap in time with the periodic fixed subframe location of the base station. The operation(s) at block 2140 may be performed using the wireless communication management component 1220, 1320, and/or 1660 described with reference to FIGS. 12, 13, and/or 16, the synchronization signal management component 1245 and/or 1355 described with reference to FIGS. 12 and/or 13, and/or the CET management component 1340 and/or transmission management component 1350 described with reference to FIG. 13.

Thus, the method 2100 may provide for wireless communication. It should be noted that the method 2100 is just one implementation and that the operations of the method 2100 may be rearranged or otherwise modified such that other implementations are possible.

Figure 22:
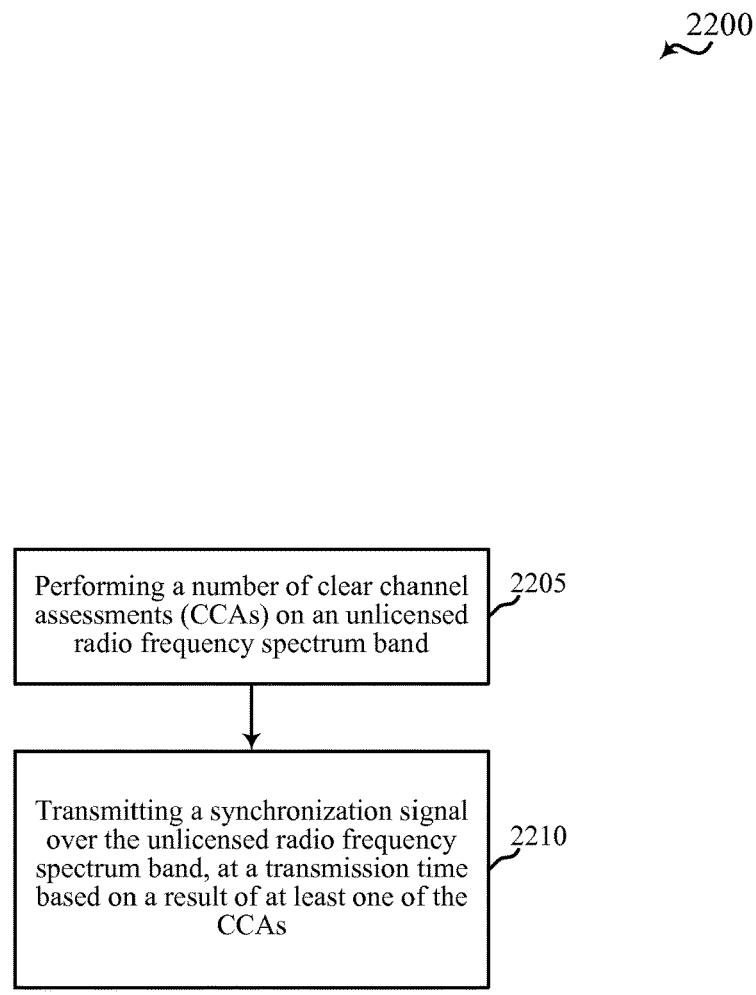
FIG. 22 is a flow chart illustrating an example of a method for wireless communication, in accordance with various aspects of the present disclosure.

FIG. 22 is a flow chart illustrating an example of a method 2200 for wireless communication, in accordance with various aspects of the present disclosure. For clarity, the method 2200 is described below with reference to aspects of one or more of the base stations 105, 205, 205-*a*, and/or 1605 described with reference to FIGS. 1, 2, and/or 16, and/or aspects of one or more of the apparatuses 1305 and/or 1405 described with reference to FIGS. 13 and/or 14. In some examples, a base station (e.g., a base station of an eNB) or apparatus may execute one or more sets of codes to control the functional elements of the base station or apparatus to perform the functions described below. Additionally or alternatively, the base station or apparatus may perform one or more of the functions described below using special-purpose hardware.

At block 2205, the method 2200 may include performing a number of CCAs on an unlicensed radio frequency spectrum band. In some examples, the number of CCA may include a plurality of CCAs. Each of the number of CCAs may be successful or unsuccessful. In some examples, the unlicensed radio frequency spectrum band may include a radio frequency spectrum band for which apparatuses may contend for access because the radio frequency spectrum band is available for unlicensed use, such as Wi-Fi use. The operation(s) at block 2205 may be performed using the wireless communication management component 1320, 1420, and/or 1660 described with reference to FIGS. 13, 14, and/or 16, and/or the CCA management component 1345 and/or 1435 described with reference to FIGS. 13 and/or 14.

At block 2210, the method 2200 may include transmitting a synchronization signal over the unlicensed radio frequency spectrum band, at a transmission time based at least in part on a result of at least one of the CCAs. In some examples, the synchronization signal may include a PSS, an SSS, a CRS (e.g., an eCRS), and/or a CSI-RS. In some examples, the method 2200 may include transmitting the synchronization signal asynchronously. In some examples, timing information may be transmitted with the synchronization signal. The timing information may include an indication of a current frame of the base station and a current subframe of the base station (e.g., for subframe synchronous transmissions of the synchronization signal). In some examples, the timing information may include an indication of a current frame of the base station, a current subframe of the base station, and/or a current symbol (e.g., for subframe asynchronous and OFDM symbol synchronous transmissions of the synchronization signal). In some examples, the method 2200 may include identifying a first successful one of the CCAs performed at block 2205, and the transmission time may follow the first successful one of the CCAs. In some examples, the method 2200 may include determining that none of the CCAs performed at block 2205 were successful, and the transmission time may follow the performance of a last unsuccessful one of the number of CCAs. The operation(s) at block 2210 may be performed using the wireless communication management component 1320, 1420, and/or 1660 described with reference to FIGS. 13, 14, and/or 16, the synchronization signal management component 1355 and/or information management component 1360 described with reference to FIG. 13, and/or the synchronization signal and timing information management component 1440 described with reference to FIG. 14.

In some examples, the method 2200 may include transmitting system information for the base station with the synchronization signal. The system information may be transmitted in a SIB and/or a MIB.

Thus, the method 2200 may provide for wireless communication. It should be noted that the method 2200 is just one implementation and that the operations of the method 2200 may be rearranged or otherwise modified such that other implementations are possible.

In some examples, aspects of one or more of the methods 2000, 2100, and/or 2200 described with reference to FIGS. 20, 21, and/or 22 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), flash memory, compact disk (CD)-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
receiving at a user equipment (UE) over an unlicensed radio frequency spectrum band an indication of a time window associated with a transmission of a synchronization signal;
waking up a receiver of the UE from a sleep state prior to the time window;
monitoring the unlicensed radio frequency spectrum band during the time window to receive the synchronization signal from a base station, wherein the time window is during a clear channel assessment (CCA)-exempt transmission (CET) of the base station; and
receiving the synchronization signal from the base station during the time window.

2. The method of claim 1, further comprising:
receiving, during the time window, timing information in the synchronization signal from the base station, the timing information comprising an indication of one from a group consisting of: a current frame of the base station, a current subframe of the base station, or a current symbol.

3. The method of claim 2, further comprising:
synchronizing the UE with the base station based at least in part on the timing information.

4. The method of claim 1, wherein the indication of the time window is received in a system information block or a master information block.

5. The method of claim 1, wherein the indication of the time window is received in a radio resource control (RRC) message.

6. The method of claim 1, further comprising:
receiving system information for the base station during the time window, the system information received in a system information block or a master information block.

7. The method of claim 1, further comprising:
performing radio resource management measurements on the synchronization signal.

8. The method of claim 1, wherein the synchronization signal comprises one from a group consisting of:
a primary synchronization signal (PSS), a secondary synchronization signal (SSS), a cell-specific reference signal (CRS), and a channel state information reference signal (CSI-RS).

9. An apparatus for wireless communication, comprising:
means for receiving at a user equipment (UE) over an unlicensed radio frequency spectrum band an indication of a time window associated with a transmission of a synchronization signal;
means for waking up a receiver of the UE from a sleep state prior to the time window;
means for monitoring the unlicensed radio frequency spectrum band during the time window to receive the synchronization signal from a base station, wherein the time window is during a clear channel assessment (CCA)-exempt transmission (CET) of the base station; and
means for receiving the synchronization signal from the base station during the time window.

10. The apparatus of claim 9, further comprising:
means for receiving, during the time window, timing information in the synchronization signal from the base station, the timing information comprising an indication of one from a group consisting of: a current frame of the base station, a current subframe of the base station, or a current symbol.

11. The apparatus of claim 10, further comprising:
means for synchronizing the UE with the base station based at least in part on the timing information.

12. The apparatus of claim 9, wherein the indication of the time window is received in a system information block or a master information block.

13. The apparatus of claim 9, wherein the indication of the time window is received in a radio resource control (RRC) message.

14. The apparatus of claim 9, further comprising:
means for receiving system information for the base station during the time window, the system information received in a system information block or a master information block.

15. The apparatus of claim 9, further comprising:
means for performing radio resource management measurements on the synchronization signal.

16. The apparatus of claim 9, wherein the synchronization signal comprises one from a group consisting of:
a primary synchronization signal (PSS), a secondary synchronization signal (SSS), a cell-specific reference signal (CRS), and a channel state information reference signal (CSI-RS).

17. An apparatus for wireless communication, comprising:
a processor; and
memory coupled to the processor, wherein the processor is configured to:
receive at a user equipment (UE) over an unlicensed radio frequency spectrum band an indication of a time window associated with a transmission of a synchronization signal;
wake up a receiver of the UE from a sleep state prior to the time window;
monitor the unlicensed radio frequency spectrum band during the time window to receive the synchronization signal from a base station, wherein the time window is during a clear channel assessment (CCA)-exempt transmission (CET) of the base station; and
receive the synchronization signal from the base station during the time window.

18. The apparatus of claim 17, wherein the processor is configured to:
receive, during the time window, timing information in the synchronization signal from the base station, the timing information comprising an indication of one from a group consisting of: a current frame of the base station, a current subframe of the base station, or a current symbol.

19. The apparatus of claim 18, wherein the processor is configured to:
synchronize the UE with the base station based at least in part on the timing information.

20. The apparatus of claim 17, wherein the processor is configured to:
receive system information for the base station during the time window, the system information received in a system information block or a master information block.

21. The apparatus of claim 17, wherein the synchronization signal comprises one from a group consisting of:
a primary synchronization signal (PSS), a secondary synchronization signal (SSS), a cell-specific reference signal (CRS), and a channel state information reference signal (CSI-RS).

22. A non-transitory computer-readable medium for storing instructions executable by a processor, comprising:
instructions to receive at a user equipment (UE) over an unlicensed radio frequency spectrum band an indication of a time window associated with a transmission of a synchronization signal;
instructions to wake up a receiver of the UE from a sleep state prior to the time window;
instructions to monitor the unlicensed radio frequency spectrum band during the time window to receive the synchronization signal from a base station, wherein the time window is during a clear channel assessment (CCA)-exempt transmission (CET) of the base station; and
instructions to receive the synchronization signal from the base station during the time window.

23. The non-transitory computer-readable medium of claim 22, further comprising:
instructions to receive, during the time window, timing information in the synchronization signal from the base station, the timing information comprising an indication of one from a group consisting of: a current frame of the base station, a current subframe of the base station, or a current symbol.

24. The non-transitory computer-readable medium of claim 22, wherein the synchronization signal comprises one from a group consisting of:

a primary synchronization signal (PSS), a secondary synchronization signal (SSS), a cell-specific reference signal (CRS), and a channel state information reference signal (CSI-RS).

25. A method for wireless communication, comprising:
transmitting, by a transmitter of a base station, an indication of a time window associated with a transmission of a synchronization signal;
performing a number of clear channel assessments (CCAs) on an unlicensed radio frequency spectrum band during the time window; and
transmitting, by the transmitter, the synchronization signal over the unlicensed radio frequency spectrum band at a transmission time during a periodic fixed subframe location within the time window, wherein the transmission time is based at least in part on a result of at least one of the CCAs.

26. The method of claim 25, wherein performing the number of CCAs on the unlicensed radio frequency spectrum band during the time window comprises:
identifying a first successful one of the CCAs during the time window;
wherein the transmission time follows the first successful one of the CCAs during the time window.

27. The method of claim 25, wherein performing the number of CCAs on the unlicensed radio frequency spectrum band during the time window comprises:
determining that none of the CCAs performed during the time window were successful;
wherein the transmission time occurs at an end of the time window.

28. The method of claim 25, further comprising:
transmitting timing information during the time window, the timing information comprising an indication of one from a group consisting of: a current frame of the base station, a current subframe of the base station, or a current symbol.

29. The method of claim 25, further comprising:
transmitting the synchronization signal over the unlicensed radio frequency spectrum band during a clear channel assessment (CCA)-exempt transmission (CET).

30. The method of claim 25, further comprising:
transmitting downlink control information (DCI) for a subframe in which the synchronization signal is transmitted, the DCI signaling at least one resource used to transmit the synchronization signal in the subframe.

31. The method of claim 25, further comprising:
transmitting the synchronization signal over the unlicensed radio frequency spectrum band opportunistically.

32. The method of claim 31, wherein the time window is associated with a different set of subcarrier frequencies of the unlicensed radio frequency spectrum band than the opportunistically transmitted synchronization signal.

33. The method of claim 31, wherein the time window overlaps in time with the periodic fixed subframe location of the base station.

34. The method of claim 25, wherein the time window replaces at least one clear channel assessment (CCA)-exempt transmission (CET) of the base station.

35. The method of claim 25, wherein the number of CCAs comprises a plurality of CCAs.

36. The method of claim 25, wherein the indication of the time window is transmitted in a system information block or a master information block.

37. The method of claim 25, wherein the indication of the time window is transmitted in a radio resource control (RRC) message.

38. The method of claim 25, further comprising:
transmitting system information for the base station during the time window, the system information being transmitted in a system information block or a master information block.

39. The method of claim 25, wherein the synchronization signal comprises one from a group consisting of:
a primary synchronization signal (PSS), a secondary synchronization signal (SSS), a cell-specific reference signal (CRS), and a channel state information reference signal (CSI-RS).

40. An apparatus for wireless communication, comprising:
means for transmitting, by a transmitter of a base station, an indication of a time window associated with a transmission of a synchronization signal;
means for performing a number of clear channel assessments (CCAs) on an unlicensed radio frequency spectrum band during the time window; and
means for transmitting, by the transmitter, the synchronization signal over the unlicensed radio frequency spectrum band at a transmission time during a periodic fixed subframe location within the time window, wherein the transmission time is based at least in part on a result of at least one of the CCAs.

41. The apparatus of claim 40, wherein the means for performing the number of CCAs on the unlicensed radio frequency spectrum band during the time window comprises:
means for identifying a first successful one of the CCAs during the time window;
wherein the transmission time follows the first successful one of the CCAs during the time window.

42. The apparatus of claim 40, wherein the means for performing the number of CCAs on the unlicensed radio frequency spectrum band during the time window comprises:
means for determining that none of the CCAs performed during the time window were successful;
wherein the transmission time occurs at an end of the time window.

43. The apparatus of claim 40, further comprising:
means for transmitting timing information during the time window, the timing information comprising an indication of one from a group consisting of: a current frame of the base station, a current subframe of the base station, or a current symbol.

44. The apparatus of claim 40, further comprising:
means for transmitting the synchronization signal over the unlicensed radio frequency spectrum band during a clear channel assessment (CCA)-exempt transmission (CET).

45. The apparatus of claim 40, further comprising:
means for transmitting downlink control information (DCI) for a subframe in which the synchronization signal is transmitted, the DCI signaling at least one resource used to transmit the synchronization signal in the subframe.

46. The apparatus of claim 40, further comprising:
means for transmitting the synchronization signal over the unlicensed radio frequency spectrum band opportunistically.

47. The apparatus of claim 46, wherein the time window is associated with a different set of subcarrier frequencies of the unlicensed radio frequency spectrum band than the opportunistically transmitted synchronization signal.

48. The apparatus of claim 46, wherein the time window overlaps in time with the periodic fixed subframe location of the base station.

49. The apparatus of claim 40, wherein the time window replaces at least one clear channel assessment (CCA)-exempt transmission (CET) of the base station.

50. The apparatus of claim 40, wherein the number of CCAs comprises a plurality of CCAs.

51. The apparatus of claim 40, wherein the indication of the time window is transmitted in a system information block or a master information block.

52. The apparatus of claim 40, wherein the indication of the time window is transmitted in a radio resource control (RRC) message.

53. The apparatus of claim 40, further comprising:
means for transmitting system information for the base station during the time window, the system information being transmitted in a system information block or a master information block.

54. The apparatus of claim 40, wherein the synchronization signal comprises one from a group consisting of:
a primary synchronization signal (PSS), a secondary synchronization signal (SSS), a cell-specific reference signal (CRS), and a channel state information reference signal (CSI-RS).

55. An apparatus for wireless communication, comprising:
a processor; and
memory coupled to the processor, wherein the processor is configured to:
transmit, by the transmitter of a base station, an indication of a time window associated with a transmission of a synchronization signal;
perform a number of clear channel assessments (CCAs) on an unlicensed radio frequency spectrum band during the time window; and
transmit, by the transmitter, the synchronization signal over the unlicensed radio frequency spectrum band at a transmission time a periodic fixed subframe location within during the time window, wherein the transmission time is based at least in part on a result of at least one of the CCAs.

56. The apparatus of claim 55, wherein the processor is configured to:
transmit timing information during the time window, the timing information comprising an indication of one from a group consisting of: a current frame of the base station, a current subframe of the base station, or a current symbol.

57. The apparatus of claim 55, wherein the processor is configured to:
transmit downlink control information (DCI) for a subframe in which the synchronization signal is transmitted, the DCI signaling at least one resource used to transmit the synchronization signal in the subframe.

58. The apparatus of claim 55, wherein the number of CCAs comprises a plurality of CCAs.

59. The apparatus of claim 55, wherein the indication of the time window is transmitted in a system information block or a master information block.

60. The apparatus of claim 55, wherein the indication of the time window is transmitted in a radio resource control (RRC) message.

61. The apparatus of claim 55, wherein the processor is configured to:
transmit system information for the base station during the time window, the system information being transmitted in a system information block or a master information block.

62. The apparatus of claim 55, wherein the synchronization signal comprises one from a group consisting of:
a primary synchronization signal (PSS), a secondary synchronization signal (SSS), a cell-specific reference signal (CRS), and a channel state information reference signal (CSI-RS).

63. A non-transitory computer-readable medium for storing instructions executable by a processor, comprising:
instructions to transmit, by a transmitter of a base station, an indication of a time window associated with a transmission of a synchronization signal;
instructions to perform a number of clear channel assessments (CCAs) on an unlicensed radio frequency spectrum band during the time window; and
instructions to transmit, by the transmitter, the synchronization signal over the unlicensed radio frequency spectrum band at a transmission time during a periodic fixed subframe location within the time window, wherein the transmission time is based at least in part on a result of at least one of the CCAs.

64. The non-transitory computer-readable medium of claim 63, further comprising:
instructions to transmit timing information during the time window, the timing information comprising an indication of one from a group consisting of: a current frame of the base station, a current subframe of the base station, or a current symbol.

65. The non-transitory computer-readable medium of claim 63, wherein the number of CCAs comprises a plurality of CCAs.

66. The non-transitory computer-readable medium of claim 63, wherein the synchronization signal comprises one from a group consisting of:
a primary synchronization signal (PSS), a secondary synchronization signal (SSS), a cell-specific reference signal (CRS), and a channel state information reference signal (CSI-RS).

67. A method for wireless communication, comprising:
monitoring an unlicensed radio frequency spectrum band, at a receiver of a user equipment (UE), to receive a transmission of a synchronization signal from a base station during a clear channel assessment (CCA)-exempt transmission (CET) of the base station; and
receiving, at the receiver, the synchronization signal from the base station.

68. The method of claim 67, wherein receiving the synchronization signal comprises receiving the synchronization signal with timing information.

69. The method of claim 68, wherein the timing information comprises an indication of a current frame of the base station and a current subframe of the base station.

70. The method of claim 68, wherein the timing information comprises an indication of a current frame of the base station, a current subframe of the base station, and a current symbol.

71. The method of claim 68, further comprising:
synchronizing the UE with the base station based at least in part on the timing information.

72. The method of claim 67, further comprising:
receiving system information for the base station with the synchronization signal, the system information being received in a system information block or a master information block.

73. The method of claim 67, further comprising:
performing radio resource management measurements on the synchronization signal.

74. The method of claim 67, wherein the synchronization signal comprises one from a group consisting of:
a primary synchronization signal (PSS), a secondary synchronization signal (SSS), a cell-specific reference signal (CRS), and a channel state information reference signal (CSI-RS).

75. An apparatus for wireless communication, comprising:
means for monitoring an unlicensed radio frequency spectrum band, at a receiver of a user equipment (UE), to receive a transmission of a synchronization signal from a base station during a clear channel assessment (CCA)-exempt transmission (CET) of the base station; and
means for receiving, at the receiver, the synchronization signal from the base station.

76. The apparatus of claim 75, wherein the means for receiving the synchronization signal comprises means for receiving the synchronization signal with timing information.

77. The apparatus of claim 76, wherein the timing information comprises an indication of a current frame of the base station and a current subframe of the base station.

78. The apparatus of claim 76, wherein the timing information comprises an indication of a current frame of the base station, a current subframe of the base station, and a current symbol.

79. The apparatus of claim 76, further comprising:
means for synchronizing the UE with the base station based at least in part on the timing information.

80. The apparatus of claim 75, further comprising:
means for receiving system information for the base station with the synchronization signal, the system information being received in a system information block or a master information block.

81. The apparatus of claim 75, further comprising:
means for performing radio resource management measurements on the synchronization signal.

82. The apparatus of claim 75, wherein the synchronization signal comprises one from a group consisting of:
a primary synchronization signal (PSS), a secondary synchronization signal (SSS), a cell-specific reference signal (CRS), and a channel state information reference signal (CSI-RS).

83. An apparatus for wireless communication, comprising:
a processor; and
memory coupled to the processor, wherein the processor is configured to:
monitor an unlicensed radio frequency spectrum band, at a receiver of a user equipment (UE), to receive a transmission of a synchronization signal from a base station during a clear channel assessment (CCA)-exempt transmission (CET) of the base station; and
receive, at the receiver, the synchronization signal from the base station.

84. The apparatus of claim 83, the processor configured to receive the synchronization signal comprises the processor configured to:
receive the synchronization signal with timing information.

85. The apparatus of claim 84, wherein the timing information comprises an indication of a current frame of the base station and a current subframe of the base station.

86. The apparatus of claim 84, wherein the timing information comprises an indication of a current frame of the base station, a current subframe of the base station, and a current symbol.

87. The apparatus of claim 84, wherein the processor is configured to:
synchronize the UE with the base station based at least in part on the timing information.

88. The apparatus of claim 83, wherein the processor is configured to:
perform radio resource management measurements on the synchronization signal.

89. The apparatus of claim 83, wherein the synchronization signal comprises one from a group consisting of:
a primary synchronization signal (PSS), a secondary synchronization signal (SSS), a cell-specific reference signal (CRS), and a channel state information reference signal (CSI-RS).

90. A non-transitory computer-readable medium for storing instructions executable by a processor, comprising:
instructions to monitor an unlicensed radio frequency spectrum band, at a receiver of a user equipment (UE), to receive a transmission of a synchronization signal from a base station during a clear channel assessment (CCA)-exempt transmission (CET) of the base station; and
instructions to receive, at the receiver, the synchronization signal from the base station.

91. The non-transitory computer-readable medium of claim 90, wherein the instructions to receive the synchronization signal comprise:
instructions to receive the synchronization signal with timing information.

92. The non-transitory computer-readable medium of claim 90, further comprising:
instructions to perform radio resource management measurements on the synchronization signal.

93. The non-transitory computer-readable medium of claim 90, wherein the synchronization signal comprises one from a group consisting of:
a primary synchronization signal (PSS), a secondary synchronization signal (SSS), a cell-specific reference signal (CRS), and a channel state information reference signal (CSI-RS).

94. A method for wireless communication, comprising:
performing, at a base station, a number of clear channel assessments (CCAs) on an unlicensed radio frequency spectrum band; and
transmitting, by a transmitter of the base station, a synchronization signal with timing information over the unlicensed radio frequency spectrum band, at a transmission time during a periodic fixed subframe based at least in part on a result of at least one of the CCAs.

95. The method of claim 94, wherein the timing information comprises an indication of a current frame of the base station and a current subframe of the base station.

96. The method of claim 94, wherein the timing information comprises an indication of a current frame of the base station, a current subframe of the base station, and a current symbol.

97. The method of claim 94, wherein performing the number of CCAs on the unlicensed radio frequency spectrum band comprises:
identifying a first successful one of the CCAs;
wherein the transmission time follows the first successful one of the CCAs.

98. The method of claim 94, wherein performing the number of CCAs on the unlicensed radio frequency spectrum band comprises:
    determining that none of the CCAs were successful;
    wherein the transmission time following a performance of a last unsuccessful one of the number of CCAs.

99. The method of claim 94, wherein the number of CCAs comprises a plurality of CCAs.

100. The method of claim 94, further comprising:
    transmitting system information for the base station with the synchronization signal, the system information being transmitted in a system information block or a master information block.

101. The method of claim 94, wherein the synchronization signal comprises one from a group consisting of:
    a primary synchronization signal (PSS), a secondary synchronization signal (SSS), a cell-specific reference signal (CRS), and a channel state information reference signal (CSI-RS).

102. An apparatus for wireless communication, comprising:
    means for performing, at a base station, a number of clear channel assessments (CCAs) on an unlicensed radio frequency spectrum band; and
    means for transmitting, by a transmitter of the base station, a synchronization signal with timing information over the unlicensed radio frequency spectrum band, at a transmission time during a periodic fixed subframe based at least in part on a result of at least one of the CCAs.

103. The apparatus of claim 102, wherein the timing information comprises an indication of a current frame of the base station and a current subframe of the base station.

104. The apparatus of claim 102, wherein the timing information comprises an indication of a current frame of the base station, a current subframe of the base station, and a current symbol.

105. The apparatus of claim 102, wherein the means for performing the number of CCAs on the unlicensed radio frequency spectrum band comprises:
    means for identifying a first successful one of the CCAs;
    wherein the transmission time follows the first successful one of the CCAs.

106. The apparatus of claim 102, wherein the means for performing the number of CCAs on the unlicensed radio frequency spectrum band comprises:
    means for determining that none of the CCAs were successful;
    wherein the transmission time following a performance of a last unsuccessful one of the number of CCAs.

107. The apparatus of claim 102, wherein the number of CCAs comprises a plurality of CCAs.

108. The apparatus of claim 102, further comprising:
    means for transmitting system information for the base station with the synchronization signal, the system information being transmitted in a system information block or a master information block.

109. The apparatus of claim 102, wherein the synchronization signal comprises one from a group consisting of:
    a primary synchronization signal (PSS), a secondary synchronization signal (SSS), a cell-specific reference signal (CRS), and a channel state information reference signal (CSI-RS).

110. An apparatus for wireless communication, comprising:
    a processor; and
    memory coupled to the processor, wherein the processor is configured to:
        perform, at a base station, a number of clear channel assessments (CCAs) on an unlicensed radio frequency spectrum band; and
        transmit, by a transmitter of the base station, a synchronization signal with timing information over the unlicensed radio frequency spectrum band, at a transmission time during a periodic fixed subframe based at least in part on a result of at least one of the CCAs.

111. The apparatus of claim 110, wherein the timing information comprises an indication of a current frame of the base station and a current subframe of the base station.

112. The apparatus of claim 110, wherein the timing information comprises an indication of a current frame of the base station, a current subframe of the base station, and a current symbol.

113. The apparatus of claim 110, wherein the number of CCAs comprises a plurality of CCAs.

114. The apparatus of claim 110, wherein the processor is configured to:
    transmit system information for the base station with the synchronization signal, the system information being transmitted in a system information block or a master information block.

115. The apparatus of claim 110, wherein the synchronization signal comprises one from a group consisting of:
    a primary synchronization signal (PSS), a secondary synchronization signal (SSS), a cell-specific reference signal (CRS), and a channel state information reference signal (CSI-RS).

116. A non-transitory computer-readable medium for storing instructions executable by a processor, comprising:
    instructions to perform, at a base station, a number of clear channel assessments (CCAs) on an unlicensed radio frequency spectrum band; and
    instructions to transmit, by a transmitter of the base station, a synchronization signal with timing information over the unlicensed radio frequency spectrum band, at a transmission time during a periodic fixed subframe based at least in part on a result of at least one of the CCAs.

117. The non-transitory computer-readable medium of claim 116, wherein the number of CCAs comprises a plurality of CCAs.

118. The non-transitory computer-readable medium of claim 116, wherein the synchronization signal comprises one from a group consisting of:
    a primary synchronization signal (PSS), a secondary synchronization signal (SSS), a cell-specific reference signal (CRS), and a channel state information reference signal (CSI-RS).

* * * * *